United States Patent
Takatsu et al.

(10) Patent No.: US 10,340,743 B2
(45) Date of Patent: Jul. 2, 2019

(54) POWER TRANSMISSION DEVICE, POWER TRANSMISSION METHOD, AND WIRELESS POWER TRANSFER SYSTEM

(71) Applicant: IHI CORPORATION, Tokyo (JP)

(72) Inventors: Yuji Takatsu, Tokyo (JP); Sho Hashizume, Tokyo (JP); Yuji Maekawa, Tokyo (JP); Eiichiro Fujiwara, Tokyo (JP)

(73) Assignee: IHI CORPORATION, Tokyo (JP)

( * ) Notice: Subject to any disclaimer, the term of this patent is extended or adjusted under 35 U.S.C. 154(b) by 130 days.

(21) Appl. No.: 15/462,346

(22) Filed: Mar. 17, 2017

(65) Prior Publication Data

US 2017/0194817 A1    Jul. 6, 2017

Related U.S. Application Data

(63) Continuation of application No. PCT/JP2015/080250, filed on Oct. 27, 2015.

(30) Foreign Application Priority Data

Oct. 28, 2014  (JP) .................................. 2014-219433
Mar. 20, 2015  (JP) .................................. 2015-057710

(51) Int. Cl.
*B60L 53/12* (2019.01)
*H02J 50/12* (2016.01)
(Continued)

(52) U.S. Cl.
CPC .............. *H02J 50/12* (2016.02); *B60L 53/12* (2019.02); *H02J 50/80* (2016.02); *H02J 50/90* (2016.02)

(58) Field of Classification Search
CPC ......... B60L 11/182; H02J 5/005; H02J 7/025; H02J 50/12; H02J 50/70; H02J 7/027;
(Continued)

(56) References Cited

U.S. PATENT DOCUMENTS

2011/0163608 A1* 7/2011 Brohlin .................. H02J 5/005
                                                    307/104
2011/0316477 A1* 12/2011 Jung ....................... H02J 7/00
                                                    320/108
(Continued)

FOREIGN PATENT DOCUMENTS

EP    2783900 A1    10/2014
EP    3157118 A1    4/2017
(Continued)

OTHER PUBLICATIONS

International Search Report mailed in corresponding International Patent Application No. PCT/JP2015/080250 dated Jan. 12, 2016, consisting of 1 pp.

*Primary Examiner* — Jared Fureman
*Assistant Examiner* — Esayas G Yeshaw
(74) *Attorney, Agent, or Firm* — Volpe and Koenig, P.C.

(57) ABSTRACT

A power transmitter includes a power converter that converts power fed from a power source into first DC power, an inverter circuit that converts the first DC power into first AC power, a power transmission coil that generates a magnetic field based on the first AC power, and is magnetically coupled with a power reception coil included in the power receiver, a sensor that detects a current and a voltage of the first DC power, and a controller that controls the power converter, wherein the controller controls the power converter to raise a voltage of the first DC power up to a first voltage lower than a predetermined power feeding time voltage predetermined, and determines whether power is not allowed to be fed to the power receiver based on the current of the first DC power when the voltage of the first DC power is the first voltage.

10 Claims, 11 Drawing Sheets

(51) Int. Cl.
*H02J 50/80* (2016.01)
*H02J 50/90* (2016.01)

(58) Field of Classification Search
CPC . H02J 7/045; H02J 7/345; H02J 50/80; Y02T 10/7005; Y02T 10/7072; Y02T 90/14; Y02T 90/122
See application file for complete search history.

(56) References Cited

U.S. PATENT DOCUMENTS

| | | | |
|---|---|---|---|
| 2012/0086394 A1* | 4/2012 | Hui | H01F 38/14 320/108 |
| 2012/0153739 A1* | 6/2012 | Cooper | H02J 5/005 307/104 |
| 2012/0161539 A1* | 6/2012 | Kim | H02J 17/00 307/104 |
| 2012/0293007 A1* | 11/2012 | Byun | H02J 17/00 307/104 |
| 2012/0306269 A1* | 12/2012 | Kim | H02J 7/025 307/11 |
| 2012/0323423 A1 | 12/2012 | Nakamura | |
| 2013/0099591 A1* | 4/2013 | Yeo | H02M 3/3376 307/104 |
| 2014/0103871 A1 | 4/2014 | Maikawa | |
| 2014/0159654 A1* | 6/2014 | Lee | H02J 7/025 320/108 |
| 2014/0285030 A1* | 9/2014 | Nakamura | H02J 5/005 307/104 |
| 2014/0305927 A1* | 10/2014 | Alexander | A47G 19/027 219/387 |
| 2015/0028691 A1 | 1/2015 | Yamauchi et al. | |
| 2015/0130271 A1 | 5/2015 | Suzuki | |
| 2015/0130272 A1 | 5/2015 | Suzuki | |
| 2015/0130294 A1 | 5/2015 | Suzuki | |
| 2015/0139359 A1* | 5/2015 | Folkmann | H04L 25/08 375/297 |
| 2015/0171820 A1 | 6/2015 | Koike | |
| 2015/0263531 A1* | 9/2015 | Kozakai | H02J 50/80 307/104 |
| 2015/0326028 A1 | 11/2015 | Suzuki | |

FOREIGN PATENT DOCUMENTS

| | | |
|---|---|---|
| JP | H9-182212 A | 7/1997 |
| JP | 2011-188679 A | 9/2011 |
| JP | 2011-132272 A1 | 10/2011 |
| JP | 2011-254633 A | 12/2011 |
| JP | 2012-005243 A | 1/2012 |
| JP | 2012-073349 A1 | 6/2012 |
| JP | 2012-249407 A | 12/2012 |
| JP | 2013-070590 A | 4/2013 |
| JP | 2013-074673 A | 4/2013 |
| JP | 2013-207984 A | 10/2013 |
| JP | 2013-207999 A | 10/2013 |
| JP | 2013-223301 A | 10/2013 |
| JP | 2014-007864 A | 1/2014 |
| JP | 2014-017894 A | 1/2014 |
| JP | 2015-100246 A | 5/2015 |
| JP | 2015-126658 A | 7/2015 |
| WO | 2011/158107 A1 | 12/2011 |
| WO | 2013/061440 A1 | 5/2013 |
| WO | 2013/137054 A1 | 9/2013 |
| WO | 2015/075514 A1 | 5/2015 |
| WO | 2015/097995 A1 | 7/2015 |

* cited by examiner

Fig.4

| POSITIONAL RELATION/ CIRCUIT STATE | MAGNITUDE OF CURRENT (IMPEDANCE) |
|---|---|
| CASE 1. POWER RECEIVER CIRCUIT SHORT-CIRCUITED | LARGE (SMALL) |
| CASE 2. MISALIGNMENT IS WITHIN RANGE IN WHICH POWER CANNOT BE FED | LARGE (SMALL) |
| CASE 3. POWER RECEIVER IS NOT ABOVE POWER TRANSMITTER | LARGER (SMALLER) THAN CASE 2. |
| CASE 4. POWER RECEIVING CIRCUIT OPEN-CIRCUITED | SMALL (LARGE) |

POWER TRANSMISSION DEVICE, POWER TRANSMISSION METHOD, AND WIRELESS POWER TRANSFER SYSTEM

CROSS-REFERENCE TO RELATED APPLICATIONS

This application is a continuation application of International Application No. PCT/JP/2015/080250, filed Oct. 27, 2015, which claims priority to Japanese Patent Application No. 2014-219433, filed on Oct. 28, 2014 and to Japanese Patent Application No. 2015-057710, filed on Mar. 20, 2015. The contents of these applications are incorporated herein by reference in their entirety.

TECHNICAL FIELD

The present disclosure relates to a power transmitter and a power transmission method suitably applied to, for example, a wireless power transfer system that wirelessly transmits power to an electric vehicle. The present disclosure relates to the wireless power transfer system. This application is based upon and claims the benefit of priority from the prior Japanese Patent Applications No. 2014-219433, filed on Oct. 28, 2014, and No. 2015-057710, filed on Mar. 20, 2015, the entire contents of which are incorporated herein by reference.

BACKGROUND ART

Recently, an electric vehicle has been drawing attention with rising interest in resource constraint or an environmental issue. The electric vehicle is a vehicle that uses electric energy as an energy source and uses an electric motor as a power source. In the electric vehicle, the motor is driven using power stored in an installed battery. In this way, the electric vehicle may travel several tens to several hundreds of kilometers by being charged once.

A plug-in scheme and a wireless power transfer scheme have been known as a power feeding scheme of feeding power for charging the installed battery to the electric vehicle. The plug-in scheme is a scheme of directly performing power feeding by inserting a power feeding plug at a distal end of a power source cord connected to a commercial power supply into a power feeding plug of the electric vehicle. The wireless power transfer scheme is a scheme of wirelessly performing power feeding using electromagnetic induction, a resonance phenomenon of an electromagnetic field, etc. from a power transmitter installed on a ground to a power receiver installed in the electric vehicle.

There is a known technology related to a wireless power transfer system that includes a power transmission unit having a power transmission coil and a power reception unit having a power reception coil which wirelessly receives power from the power transmission coil. As such a technology, for example, in a power transfer system described in Patent Literature 2, a relation between a misalignment and reflected power obtained when power output from the power transmission unit is reflected to return to the power transmission unit is prepared in advance. A misalignment between the power transmission coil and the power reception coil is examined based on the relation and detected actual reflected power. In a parking assistance device described in Patent Literature 3, a positional relation between a power reception unit of a vehicle and a power transmission unit of a power transmitter is detected based on an image captured by a camera. The vehicle is controlled such that the vehicle is guided to the power transmission unit based on a result of the detection. In a parking assistance device described in Patent Literature 4, a relation between a power reception condition and a distance between a power transmission unit and a power reception unit is determined in advance in response to an output of a height sensor that detects a change in a vehicle height. Positioning is performed based on the power reception condition and the output of the height sensor using this relation.

CITATION LIST

Patent Literature

Patent Literature 1: Japanese Unexamined Patent Publication No. 2013-70590
Patent Literature 2: Japanese Unexamined Patent Publication No. 2013-074673
Patent Literature 3: Japanese Unexamined Patent Publication No. 2011-188679
Patent Literature 4: Re-publication of PCT International Publication No. 2011/132272

SUMMARY

Technical Problem

Incidentally, in order to appropriately feed power to an electric vehicle to which the wireless power transfer scheme is applied as a power feeding scheme, a power transmission coil (primary coil) of a power transmitter installed on a ground and a power reception coil (secondary coil) of a power receiver installed in the electric vehicle need to be accurately aligned in a predetermined positional relation.

The coils need to be accurately aligned since impedance changes due to a change in a distance between the power transmission coil and the power reception coil and efficiency of transmitting power from the power transmitter to the power receiver decreases when a misalignment occurs between the power transmission coil and the power reception coil. For this reason, the power transmitter cannot perform power feeding when a misalignment not allowing desired power transmission efficiency occurs.

A scheme of installing a camera in an electric vehicle, and visually detecting a misalignment between a power transmission coil and a power reception coil based on an output image thereof has been proposed as a scheme of detecting a positional relation between the power transmission coil and the power reception coil (for example, Patent Literature 1).

However, according to this scheme, the camera is required, and thus the number of components as a whole wireless power transfer system increases. For this reason, there have been problems that a system configuration is complicated and a manufacturing cost increases. A camera having a high resolution is needed. Detection of a misalignment in a dark place is difficult.

Further, even when the power transmission coil and the power reception coil are in the predetermined positional relation, for example, if the power receiver is a short circuit state, or the power receiver is in an open circuit state (a state in which the power receiver is not connected to a battery) due to a broken wire, etc., there is a problem that the power transmitter cannot perform power feeding.

In the technology described in Patent Literature 2, a relation between reflected power and a misalignment changes according to an installation position, etc. of the power transmission coil or the power reception coil. For this reason, for example, the relation needs to be reset depending on vehicles in which the power reception coil is installed, and there is a problem of complicatedness. In the technologies described in Patent Literature 3 and Patent Literature 4, devices such as the camera, the height sensor, etc. are required. For this reason, there is a problem that complication of control of the wireless power transfer system and a cost increase are caused in association with an increase in the devices.

The disclosure has been conceived in consideration of the above points, and describes a power transmitter, a power transmission method, and a wireless power transfer system capable of determining whether power is fed to a power receiver without using a camera.

Solution to Problem

A power transmitter according to one aspect of the disclosure is a power transmitter that wirelessly transmits power to a power receiver including a power converter that converts power fed from a power source into first direct current (DC) power, an inverter circuit that converts the first DC power output from the power converter into first alternating current (AC) power, a power transmission coil that generates a magnetic field based on the first AC power fed from the inverter circuit, and is magnetically coupled with a power reception coil included in the power receiver, a sensor that detects a current value and a voltage value of the first DC power, and a controller that controls the power converter, wherein the controller controls the power converter to raise a voltage of the first DC power up to a first voltage value lower than a power feeding time voltage value predetermined as a voltage value at a time of feeding power to the power receiver, and determines whether power is not allowed to be fed to the power receiver based on the current value of the first DC power detected by the sensor when the voltage of the first DC power is the first voltage value.

A power transmission method according to another aspect of the disclosure is a power transmission method performed by a power transmitter that wirelessly transmits power to a power receiver, wherein the power transmitter includes a power converter that converts power fed from a power source into first DC power, an inverter circuit that converts the first DC power output from the power converter into first AC power, a power transmission coil that generates a magnetic field based on the first AC power fed from the inverter circuit, and is magnetically coupled with a power reception coil included in the power receiver, a sensor that detects a current value and a voltage value of the first DC power, and a controller that controls the power converter, and the power transmission method includes a first step in which the controller controls the power converter to raise a voltage of the first DC power up to a first voltage value lower than a power feeding time voltage value predetermined as a voltage value at a time of feeding power to the power receiver, and a second step in which the controller determines whether power is not allowed to be fed to the power receiver based on the current value of the first DC power detected by the sensor when the voltage of the first DC power is the first voltage value.

Effects

According to some aspects of the disclosure, it is possible to determine whether power can be fed to a power receiver without using a camera.

BRIEF DESCRIPTION OF DRAWINGS

FIG. 4 is a table illustrating a positional relation between the power transmission coil and the power reception coil, and a relation between a current value of DC power output from the power transmission-side power converter to the inverter circuit and impedance of the magnetic coupling circuit.

DESCRIPTION OF EMBODIMENTS

Figure 1:
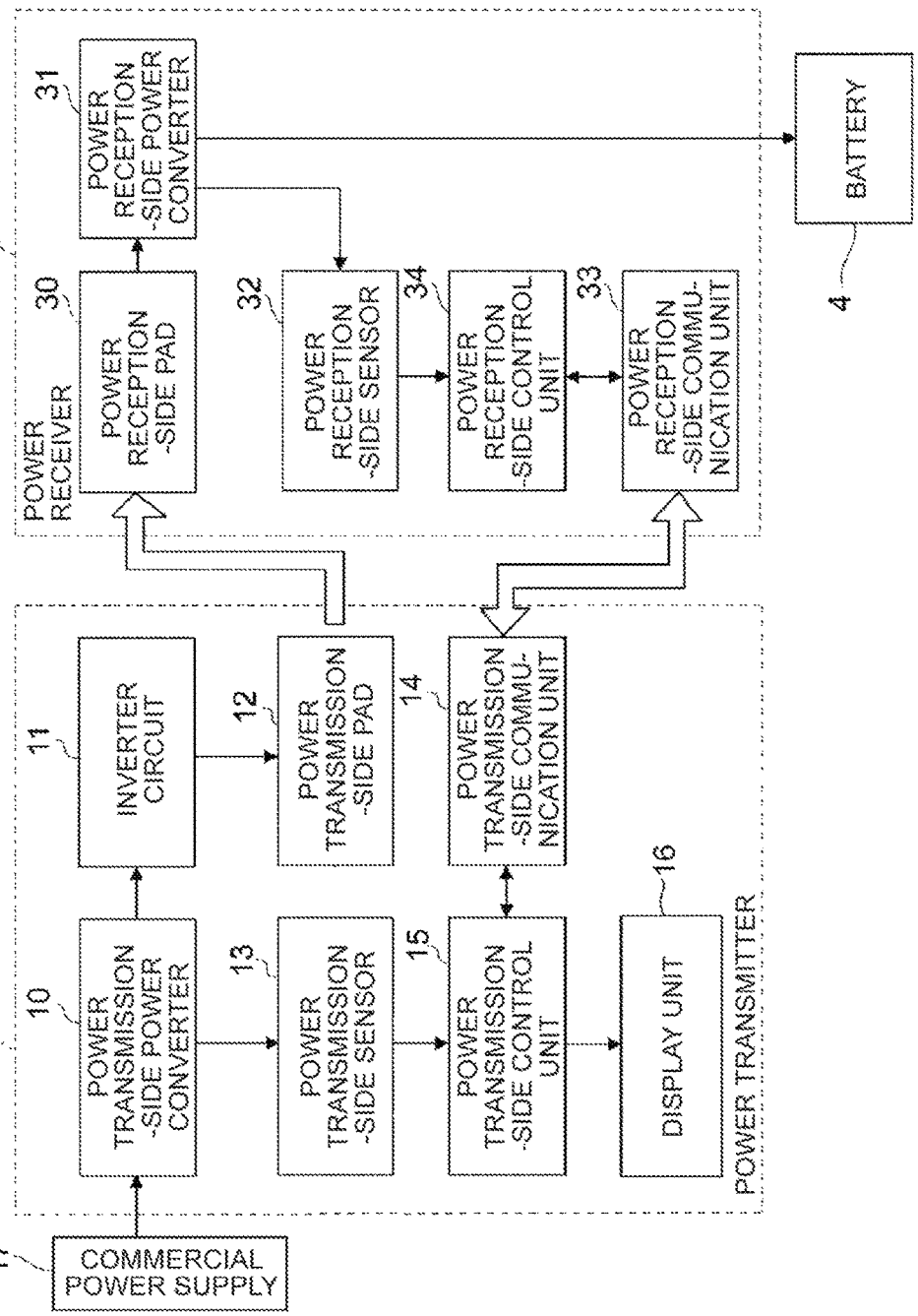
FIG. 1 is a block diagram illustrating an overall configuration of a wireless power transfer system of a first embodiment of the disclosure.

A power transmitter according to one aspect of the disclosure is a power transmitter that wirelessly transmits power to a power receiver including a power converter that converts power fed from a power source into first DC power, an inverter circuit that converts the first DC power output from the power converter into first AC power, a power transmission coil that generates a magnetic field based on the first AC power fed from the inverter circuit, and is magnetically coupled with a power reception coil included in the power receiver, a sensor that detects a current value and a voltage value of the first DC power, and a controller that controls the power converter, wherein the controller controls the power converter to raise a voltage of the first DC power up to a first voltage value lower than a power feeding time voltage value predetermined as a voltage value at a time of feeding power to the power receiver, and determines whether power is not allowed to be fed to the power receiver based on the current value of the first DC power detected by the sensor when the voltage of the first DC power is the first voltage value.

A power transmission method according to another aspect of the disclosure is a power transmission method performed by a power transmitter that wirelessly transmits power to a power receiver, wherein the power transmitter includes a power converter that converts power fed from a power source into first DC power, an inverter circuit that converts the first DC power output from the power converter into first AC power, a power transmission coil that generates a magnetic field based on the first AC power fed from the inverter circuit, and is magnetically coupled with a power reception coil included in the power receiver, a sensor that detects a current value and a voltage value of the first DC power, and a controller that controls the power converter, and the power transmission method includes a first step in which the controller controls the power converter to raise a voltage of the first DC power up to a first voltage value lower than a power feeding time voltage value predetermined as a voltage value at a time of feeding power to the power receiver, and a second step in which the controller determines whether power is not allowed to be fed to the power receiver based on the current value of the first DC power detected by the sensor when the voltage of the first DC power is the first voltage value.

According to the power transmitter and the power transmission method related to some aspects of the disclosure, whether power cannot be fed from the power transmitter to the power receiver may be determined without requiring a particular component such as a camera for positioning the power transmission coil and the power reception coil.

A wireless power transfer system according to still another aspect of the disclosure includes a power transmission unit that has a first resonance circuit including a power transmission coil, a power reception unit that has a second resonance circuit including a power reception coil, and wirelessly receives power from the power transmission unit, and a controller that controls power supply from the power transmission unit to the power reception unit, wherein the controller detects a change in a characteristic value related to the power supply, the change occurring depending on a misalignment amount between the power transmission coil and the power reception coil, and performs a determination control operation of determining whether a misalignment between the power transmission coil and the power reception coil corresponds to a permissible range based on the change in the characteristic value.

In this wireless power transfer system, the first resonance circuit includes the power transmission coil, and the second resonance circuit includes the power reception coil. The change in the characteristic value related to the power supply, the change occurring depending on the misalignment amount between the power transmission coil and the power reception coil is detected by the controller. Depending on the misalignment amount, a degree of coupling between the power transmission coil and the power reception coil changes, and the characteristic value applied to the power reception unit changes. For this reason, a change in a distance between the power transmission coil and the power reception coil (a distance between power transmission and power reception) may be identified by detecting the change in the characteristic value. Therefore, whether the misalignment between the power transmission coil and the power reception coil corresponds to the permissible range may be easily determined based on the change in the characteristic value. Whether power can be fed to the power reception unit may be determined without using a camera.

In a wireless power transfer system according to one aspect of the disclosure, the controller may determine that the misalignment corresponds to the permissible range when the characteristic value becomes equal to a threshold value smaller than a maximum value while the characteristic value decreases after the characteristic value becomes the maximum value from a lower value than a range of a value that can be taken by the characteristic value when the misalignment corresponds to the permissible range after the determination control operation starts. In this case, after the determination control operation starts, a misalignment amount, at which the characteristic value becomes the maximum value from the lower value than the range of the value that can be taken by the characteristic value when the misalignment corresponds to the permissible range, is present. Using this characteristic, the misalignment may be considered to correspond to the permissible range when the characteristic value becomes equal to the threshold value smaller than the maximum value while the characteristic value decreases after the characteristic value becomes the maximum value.

In a wireless power transfer system according to one aspect of the disclosure, the characteristic value may be a voltage applied to the power reception unit by power supply from the power transmission unit. In this case, the change in the characteristic value related to the power supply may be easily detected.

A wireless power transfer system according to one aspect of the disclosure may further include a notification unit. Herein, when the misalignment is determined to correspond to the permissible range by the controller, the notification unit notifies content thereof. In this case, for example, a driver of a vehicle in which the wireless power transfer system is installed may easily recognize whether the misalignment corresponds to the permissible range.

Hereinafter, embodiments of the disclosure will be described with reference to drawings. In description of the drawings, the same reference numeral will be assigned to the same component, and a repeated description will be omitted.

First Embodiment (1) Configuration of Wireless Power Transfer System

Figure 2:
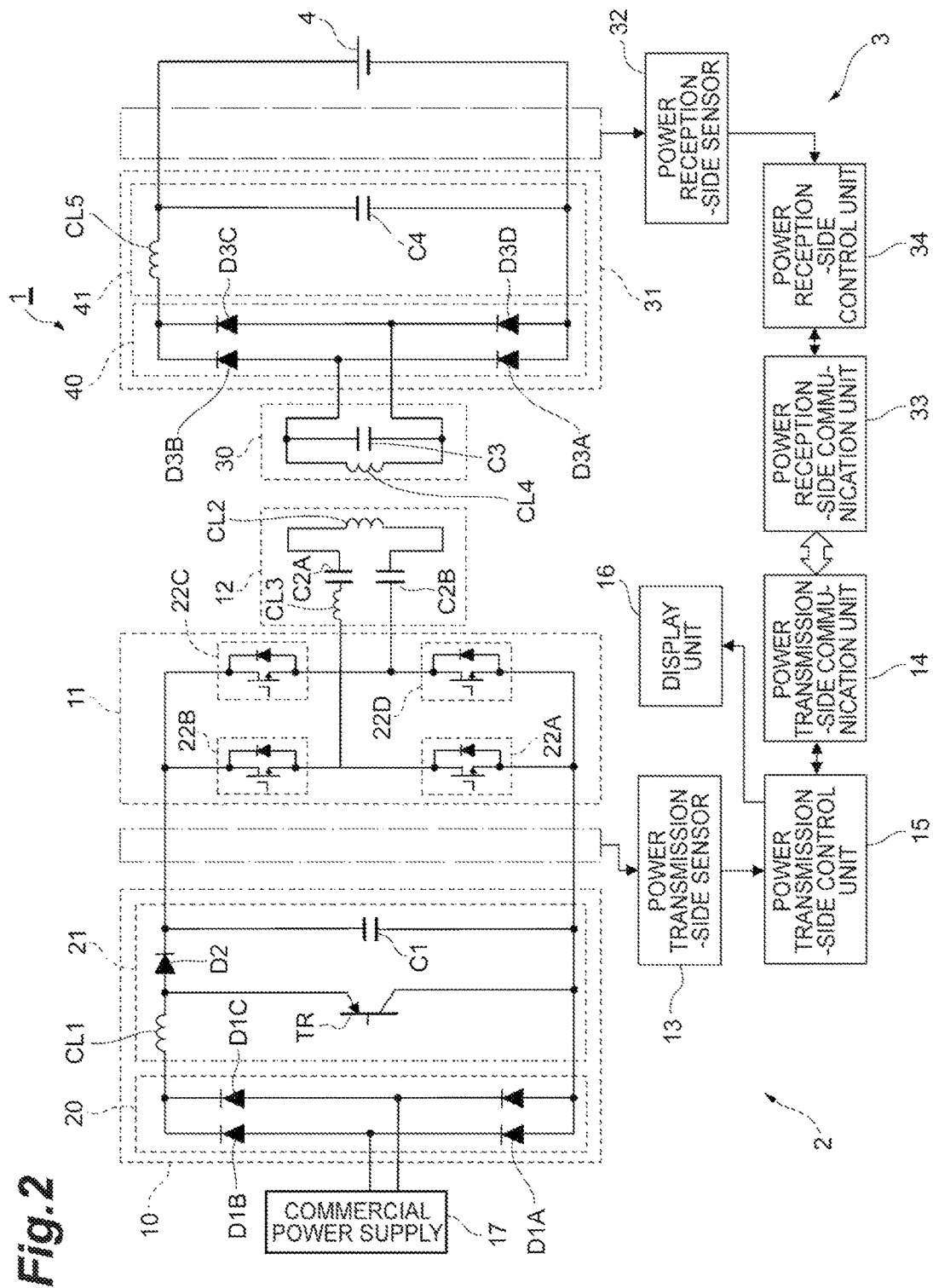
FIG. 2 is a circuit diagram illustrating a circuit configuration of a part of the wireless power transfer system of FIG. 1.

As illustrated in FIG. 1 and FIG. 2, for example, a wireless power transfer system 1 according to a first embodiment includes a power transmitter 2 installed on a parking lot of a home, an apartment, etc. and a power receiver 3 installed in an electric vehicle.

The power transmitter 2 has a function of wirelessly transmitting power to the power receiver 3. The power transmitter 2 includes a power transmission-side power converter 10, an inverter circuit 11, a power transmission-side pad 12, a power transmission-side sensor 13, a power transmission-side communication unit 14, a power transmission-side control unit (power transmission-side controller) 15, and a display unit 16.

The power transmission-side power converter 10 is an AC/DC converter that converts AC power (for example, 100 V) fed from a commercial power supply (power supply) 17 into DC power (hereinafter referred to as first DC power) having a predetermined voltage. As illustrated in FIG. 2, for example, the power transmission-side power converter 10 includes a rectifier 20 and a chopper circuit 21. For example, the rectifier 20 includes a diode bridge in which four diodes D1A to D1D are connected in a bridge shape. The rectifier 20 full-wave rectifies AC power supplied from the commercial power supply 17, and outputs the rectified AC power to the chopper circuit 21. For example, the chopper circuit 21 includes a boosting chopper circuit having a coil CL1, a diode D2, a switching transistor TR, and a smoothing capacitor C1. The chopper circuit 21 turns ON or OFF the switching transistor TR at a high frequency by control of the power transmission-side control unit 15. In this way, the chopper circuit 21 boosts the full-wave rectified AC power supplied from the rectifier 20 to a predetermined voltage. The chopper circuit 21 converts the boosted AC power into DC power (first DC power) by smoothing the AC power using the smoothing capacitor C1. The chopper circuit 21 outputs the DC power to the inverter circuit 11.

The inverter circuit 11 is a DC/AC converter that converts the first DC power fed from the power transmission-side power converter 10 into AC power (hereinafter referred to as first AC power) of a predetermined frequency. As illustrated in FIG. 2, for example, the inverter circuit 11 is configured by connecting four switching elements 22A to 22D such as an IGBT (Insulated Gate Bipolar Transistor), a MOSFET (Metal-Oxide-Semiconductor Field-Effect Transistor), etc. in a bridge shape. The inverter circuit 11 turns ON or OFF the switching elements 22A to 22D at a high frequency by control of the power transmission-side control unit 15. In this way, the inverter circuit 11 converts the first DC power supplied from the power transmission-side power converter 10 into the first AC power. The inverter circuit 11 outputs the first AC power to the power transmission-side pad 12.

For example, the power transmission-side pad 12 includes a circuit having a power transmission coil CL2, power transmission condensers C2A and C2B, and a second coil CL3. The power transmission-side pad 12 generates a magnetic field in the power transmission coil CL2 based on the first AC power supplied from the inverter circuit 11. In this case, the power transmission coil CL2 is fixed and disposed at a predetermined position of a parking lot to oppose a bottom surface of an electric vehicle to be charged in parallel with the bottom surface. The power transmission condensers C2A and C2B may include variable condensers. The second coil CL3 may function as a variable reactor.

The power transmission-side sensor 13 detects a current value and a voltage value of the first DC power output from the power transmission-side power converter 10. The power transmission-side sensor 13 transmits a detection signal of a detection result thereof to the power transmission-side control unit 15. For example, the power transmission-side sensor 13 may include a sensor having a configuration in which a magnetic field generated around an electric wire through which a current passes is measured by Hall effect and a current value is detected based on a measurement result, and a sensor having a configuration in which a voltage drop occurring by a resistor inserted into an electric wire through which a current passes is measured and a current value is detected based on a measurement result. For example, the power transmission-side sensor 13 may include a sensor having a configuration in which a voltage of the first DC power is divided and a current value of the first DC power is measured based on a current value of the divided voltage.

The power transmission-side communication unit 14 is a communication device having a function of communicating with a power reception-side communication unit 33 of the power receiver 3 described below. For example, a short distance radio communication scheme such as ZigBee (registered trademark) or Bluetooth (registered trademark) or a short distance optical communication scheme using an optical signal is applicable to a communication scheme between the power transmission-side communication unit 14 and the power reception-side communication unit 33. When the short distance radio communication scheme is applied to the communication scheme between the power transmission-side communication unit 14 and the power reception-side communication unit 33, the power transmission-side communication unit 14 includes an antenna. When the short distance optical communication scheme is applied, the power transmission-side communication unit 14 includes a light emitting element and a light receiving element for communication.

The power transmission-side control unit 15 is a microcomputer including a central processing unit (CPU), a read only memory (ROM), and a random access memory (RAM). The power transmission-side control unit 15 controls the whole power transmitter 2 based on a program stored in the ROM, a detection signal fed from the power transmission-side sensor 13, and information from the power receiver 3 acquired through the power transmission-side communication unit 14. For example, the power transmission-side control unit 15 raises or drops a voltage value of the first DC power output from the power transmission-side power converter 10 by increasing or decreasing a duty ratio of time during which a driving signal is turned ON to time during which the driving signal is turned OFF. Here, the driving signal is applied to a base of the switching transistor TR of the chopper circuit 21 (FIG. 2) included in the power transmission-side power converter 10 as necessary.

For example, the display unit 16 includes a liquid crystal panel, etc. The display unit 16 displays a variety of information including a diagnosis result described below by control of the power transmission-side control unit 15.

Meanwhile, the power receiver 3 receives AC power wirelessly transmitted from the power transmitter 2. The power receiver 3 has a function of converting received AC power into DC power and supplying the converted DC power to a battery (load) 4 (see FIG. 1). The power receiver 3 includes a power reception-side pad 30, a power reception-side power converter 31, a power reception-side sensor 32, the power reception-side communication unit 33, and a power reception-side control unit (power reception-side controller) 34.

The power reception-side pad 30 is a circuit including a power reception coil CL4 and a power reception condenser C. The power reception-side pad 30 wirelessly receives AC power supplied to the power transmission coil CL2 and AC power having a magnitude according to a coupling coefficient between the power transmission coil CL2 and the power reception coil CL4 (hereinafter referred to as second AC power) from the power transmission-side pad 12 when the power reception coil CL4 is magnetically coupled to the power transmission coil CL2 of the power transmission-side pad 12. The power reception-side pad 30 outputs the received second AC power to the power reception-side power converter 31.

The power reception-side power converter 31 is an AC/DC converter that converts second AC power fed from the power reception-side pad 30 into DC power (hereinafter referred to as second DC power). As illustrated in FIG. 2, the power reception-side power converter 31 includes a rectifier 40 and a filter circuit 41. For example, the rectifier 40 includes a diode bridge in which four diodes D3A to D3D are connected in a bridge shape. The rectifier 40 full-wave rectifies the second AC power fed from the power reception-side pad 30, and outputs the rectified AC power to the filter circuit 41. For example, the filter circuit 41 includes a coil CL5 and a smoothing capacitor. The filter circuit 41 eliminates noise from the full-wave rectified second AC power fed from the rectifier 40 and smoothes the second AC power. In this way, the power reception-side power converter 31 obtains the second DC power. The power reception-side power converter 31 outputs the obtained second DC power to a battery 4. The battery 4 is charged with the second DC power.

The power reception-side sensor 32 detects a current value and a voltage value of the second DC power fed from the power reception-side power converter 31 to the battery 4. The power reception-side sensor 32 transmits a detection signal of a detection result thereof to the power reception-side control unit 34. The same configuration as that of the power transmission-side sensor 13 described above may be applied to the power reception-side sensor 32.

The power reception-side communication unit 33 is a communication device that has a function of communicating with the power transmission-side communication unit 14 of the power transmitter 2 described above. The power reception-side communication unit 33 is configured similarly to the power transmission-side communication unit 14. For example, the power reception-side communication unit 33 notifies the power transmitter 2 of the current value and the voltage value of the second DC power detected by the power reception-side sensor 32.

The power reception-side control unit 34 is a microcomputer including a CPU, a ROM, and a RAM similarly to the power transmission-side control unit 15. For example, the power reception-side control unit 34 receives a necessary command or information between the power reception-side control unit 34 and the power transmission-side control unit 15 through the power reception-side communication unit 33. The power reception-side control unit 34 controls the whole power receiver 3 according to the received command and a program stored in the ROM.

The battery 4 includes a secondary battery such as a lithium-ion battery or a nickel-hydride battery, or a high-capacity electric double layer capacitor. The battery 4 is connected to an inverter (inverter for running) (not illustrated) that drives a motor for running of an electric vehicle, or a control component that controls driving of the electric vehicle. The battery 4 supplies power to the inverter for running and the control component. For example, a battery controller (not illustrated) is provided in the battery 4, and the battery controller monitors a charge state (a charging voltage, a charging current, charging power, etc.) of the battery 4. The battery controller delivers information based on the charge state to the power transmission-side control unit 15 through the power reception-side communication unit 33 and the power transmission-side communication unit 14. For example, the information based on the charge state refers to information related to whether the battery 4 is fully charged.

(2) Power Transmission Control Scheme

Next, a description will be given of a power transmission control scheme employed for the wireless power transfer system 1.

In the wireless power transfer system 1, the current value and the voltage value of the first DC power detected by the power transmission-side sensor 13 of the power transmitter 2 are set to $I_S$ and $V_S$, respectively, and the current value and the voltage value of the second DC power detected by the power reception-side sensor 32 of the power receiver 3 are set to $I_R$ and $V_R$, respectively. In this case, a power transmission efficiency η from the power transmitter 2 to the power receiver 3 is calculated by the following Equation.

[Equation 1]

$$\eta = \frac{P_R}{P_S} \times 100 = \frac{I_R \times V_R}{I_S \times V_S} \times 100 \qquad (1)$$

A maximum value in a state in which the power transmission coil CL2 and the power reception coil CL4 are aligned in a predetermined positional relation is set as the power transmission efficiency η. The power transmission efficiency η gradually decreases as a misalignment amount between the power transmission coil CL2 and the power reception coil CL4 increases. Therefore, the power transmitter 2 side may determine whether the power transmission coil CL2 and the power reception coil CL4 are aligned in the predetermined positional relation by monitoring the power transmission efficiency η.

Incidentally, power having a certain magnitude needs to be transmitted from the power transmitter 2 to the power receiver 3 in order to detect the predetermined positional relation between the power transmission coil CL2 and the power reception coil CL4 using this scheme. However, for example, when the power receiver 3 is not present within a range in which the power transmitter 2 can feed power (when a misalignment between the power transmission coil CL2 and the power reception coil CL4 is large, or when the power receiver 3 is not originally present around the power transmission coil CL2), or when the power receiver 3 is short-circuited, if the power transmitter 2 performs an operation of transmitting the power having the certain magnitude to the power receiver 3, there is a concern that the current value of the first DC power output from the power transmission-side power converter 10 of the power transmitter 2 may become excessively large, or a voltage applied to each element of the power transmitter 2 or the power receiver 3 may become excessively large. As a result, there is a concern that the power transmitter 2 or the power receiver 3 may be damaged.

Figure 3:
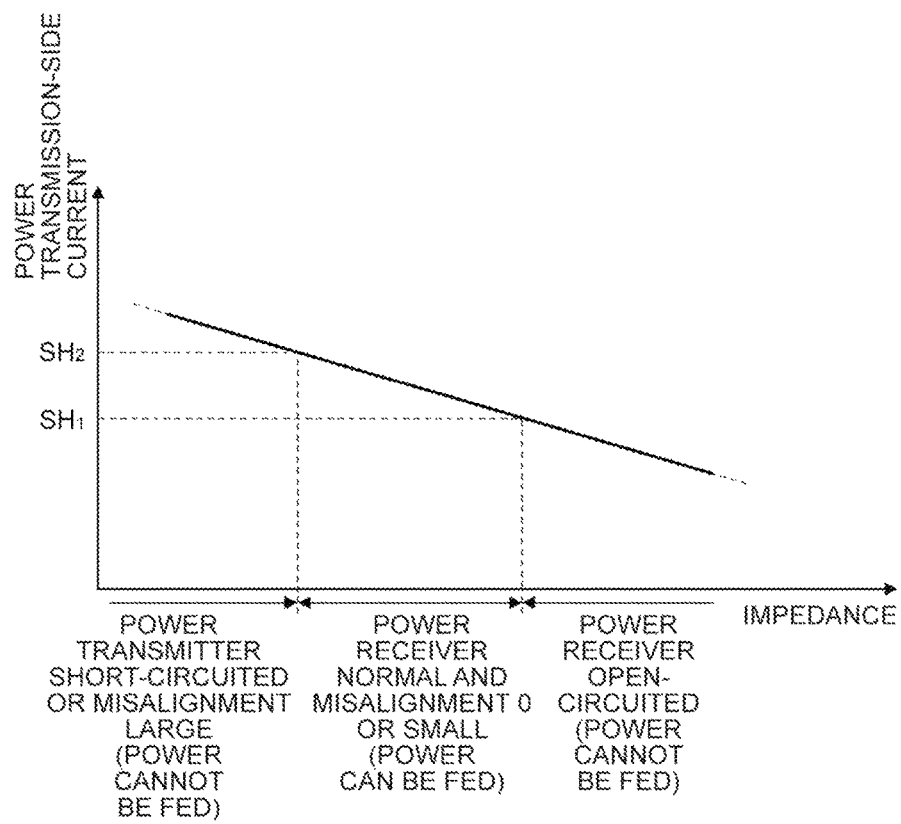
FIG. 3 is a graph illustrating a positional relation between a power transmission coil and a power reception coil, and a relation between a current value of DC power output from a power transmission-side power converter to an inverter circuit and impedance of a magnetic coupling circuit.

Meanwhile, in a case in which the voltage value of the first DC power output from the power transmission-side power converter 10 of the power transmitter 2 is maintained constant in the wireless power transfer system 1, as illustrated in FIG. 3 and FIG. 4, the current value of the first DC power detected by the power transmission-side sensor 13 of the power transmitter 2 becomes larger when the power receiver 3 is not present within a range in which the power transmitter 2 can feed power or the power receiver 3 is in a short-circuited state when compared to a case in which the power receiver 3 is present within the range in which the power transmitter 2 can feed power and the power receiver 3 is in a normal state. A reason therefor is that impedance obtained when a power reception side is viewed from the power transmission-side power converter 10 becomes smaller when the power receiver 3 is not present within the range in which the power transmitter 2 can feed power or the power receiver 3 is in the short-circuited state when compared to a case in which the power receiver 3 is present within the range in which the power transmitter 2 can feed power and the power receiver 3 is in the normal state. For example, the normal state refers to a state in which the power receiver 3 is not short-circuited. The impedance when viewing the power reception side from the power transmission-side power converter 10 refers to impedance of the power reception side based on the power transmission-side power converter 10.

For example, in a case in which the voltage value of the first DC power fed from the power transmission-side power converter 10 of the power transmitter 2 to the inverter circuit 11 is maintained constant in the wireless power transfer system 1, the current value of the first DC power detected by the power transmission-side sensor 13 of the power transmitter 2 becomes smaller when the power receiver 3 is in an open state (a state in which the battery 4 is not connected to the power receiver 3) when compared to a case in which the power receiver 3 is present within the range in which the power transmitter 2 can feed power and the power receiver 3 is in the normal state. A reason therefor is that impedance when viewing the power reception side from the power transmission-side power converter 10 becomes larger when the power receiver 3 is in the open state when compared to the case in which the power receiver 3 is present within the range in which the power transmitter 2 can feed power and the power receiver 3 is in the normal state.

In this regard, in the case of the wireless power transfer system 1, the power transmitter 2 drives the inverter circuit 11 while the voltage value of the first DC power output from the power transmission-side power converter 10 is suppressed at a lower value than a voltage value at the time of feeding power to the power receiver 3 (hereinafter referred to as a power feeding time voltage value) at an initial time of an operation of transmitting power to the power receiver 3. The power transmitter 2 determines whether power cannot be fed to the power receiver 3 based on the current value of the first DC power at this time. The power feeding time voltage value is a value of a voltage to be output by the power transmission-side power converter 10 such that desired power is supplied to the battery 4. The power feeding time voltage value is different depending on a position at which the power receiver 3 is present within the range in which power can be fed. For example, the power receiver 3 is disposed at places changed within the range in which power can be fed, a voltage value at the time of power feeding is measured at each place of the power receiver 3, and a range of an output voltage of the power transmission-side power converter 10 is obtained in advance as a range of an output voltage at which desired power is supplied to the battery 4. For example, the power feeding time voltage value is an arbitrary voltage value included in the range of the output voltage. In particular, the power feeding time voltage value may be a minimum voltage value included in the range of the output voltage.

When a affirmative result is obtained in the above-described determination, the power transmitter 2 increases the voltage value of the first DC power. The power transmitter 2 detects a misalignment amount between the power transmission coil CL2 and the power reception coil CL4 based on the current value of the first DC power or the power transmission efficiency η calculated by Equation (1). The power transmitter 2 determines whether power cannot be fed to the power receiver 3 based on a detection result. The power transmitter 2 continues to transmit power to the power receiver 3 when a affirmative result is obtained in this determination.

Figure 5:
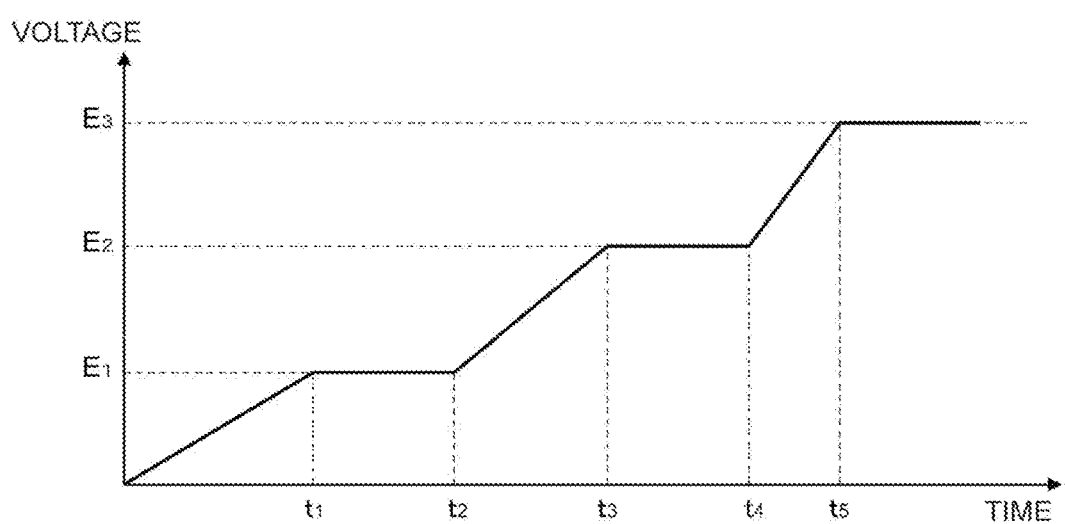
FIG. 5 is a graph illustrating a form of a change in a voltage value of DC power output from the power transmission-side power converter to the inverter circuit.

Specifically, as illustrated in FIG. 5, at the initial time of the operation of transmitting power to the power receiver 3, the power transmitter 2 gradually increases the voltage of the first DC power output from the power transmission-side power converter 10 to the inverter circuit 11 from 0 V to a first voltage value $E_1$ (time 0 to time $t_1$). The first voltage value $E_1$ is a voltage value at which no damage to the power transmitter 2 is previously confirmed to occur.

In response to the voltage of the first DC power reaching up to the first voltage value $E_1$, the power transmitter 2 detects the current value of the first DC power (time $t_1$ to time $t_2$).

The power transmitter 2 suspends the operation of transmitting power to the power receiver 3 when a value (current value) of a current (power transmission-side current) of the first DC power is greater than a predetermined upper limit ($SH_2$ of FIG. 3, hereinafter referred to as a current upper limit threshold value) or less than a predetermined lower limit ($SH_1$ of the figure, hereinafter referred to as a current lower limit threshold value).

On the other hand, the power transmitter 2 gradually increases the voltage of the first DC power up to a predetermined second voltage value $E_2$ greater than the first voltage value $E_1$ and smaller than the above-described power feeding time voltage value $E_3$ when the current value of the first DC power is less than or equal to the current upper limit threshold value $SH_2$ and greater than or equal to the current lower limit threshold value $SH_1$ (time $t_2$ to time $t_3$).

In response to the voltage of the first DC power reaching up to the second voltage value $E_2$, the power transmitter 2 acquires the current value of the first DC power detected by the power transmission-side sensor 13 at this time while maintaining the voltage at the second voltage value $E_2$. Besides, the power transmitter 2 acquires the current value and the voltage value of the second DC power detected by the power reception-side sensor 32 from the power receiver 3, and calculates the power transmission efficiency η between the power transmitter 2 and the power receiver 3 using Equation (1) based on these current value and voltage value and on the current value and the voltage value of the first DC power fed from the power transmission-side sensor 13 at this time (time $t_3$ to time $t_4$).

The power transmitter 2 suspends the operation of transmitting power to the power receiver 3 when the current value of the first DC power is greater than the current upper limit threshold value $SH_2$, when the current value is less than the current lower limit threshold value $SH_1$, or when the calculated power transmission efficiency η is less than a predetermined threshold value (hereinafter referred to as an efficient threshold value).

On the other hand, the power transmitter 2 gradually increases the voltage of the first DC power up to the above-described power feeding time voltage value $E_3$ (time $t_4$ to time $t_5$) when the current value of the first DC power is between the current upper limit threshold value $SH_2$ and the current lower limit threshold value $SH_1$, and the calculated power transmission efficiency η is greater than the above-described efficient threshold value.

Thereafter, the power transmitter 2 acquires the current value and the voltage value of the second DC power detected by the power reception-side sensor 32 by communicating with the power receiver 3 on a regular basis, and calculates the power transmission efficiency η between the power transmitter 2 and the power receiver 3 using Equation (1) based on the acquired current value and voltage value and on the current value and the voltage value of the first DC power fed from the power transmission-side sensor 13 at this time (time $t_5$~).

When the calculated power transmission efficiency η is greater than the above-described efficient threshold value, the power transmitter 2 maintains a voltage of the first DC power output from the power transmission-side power converter 10 to the inverter circuit 11 at the power feeding time voltage value $E_3$. On the other hand, when the calculated power transmission efficiency η is less than the above-described efficient threshold value or when the battery 4 is fully charged, the power transmitter 2 suspends the operation of transmitting power to the power receiver 3.

Figure 6:
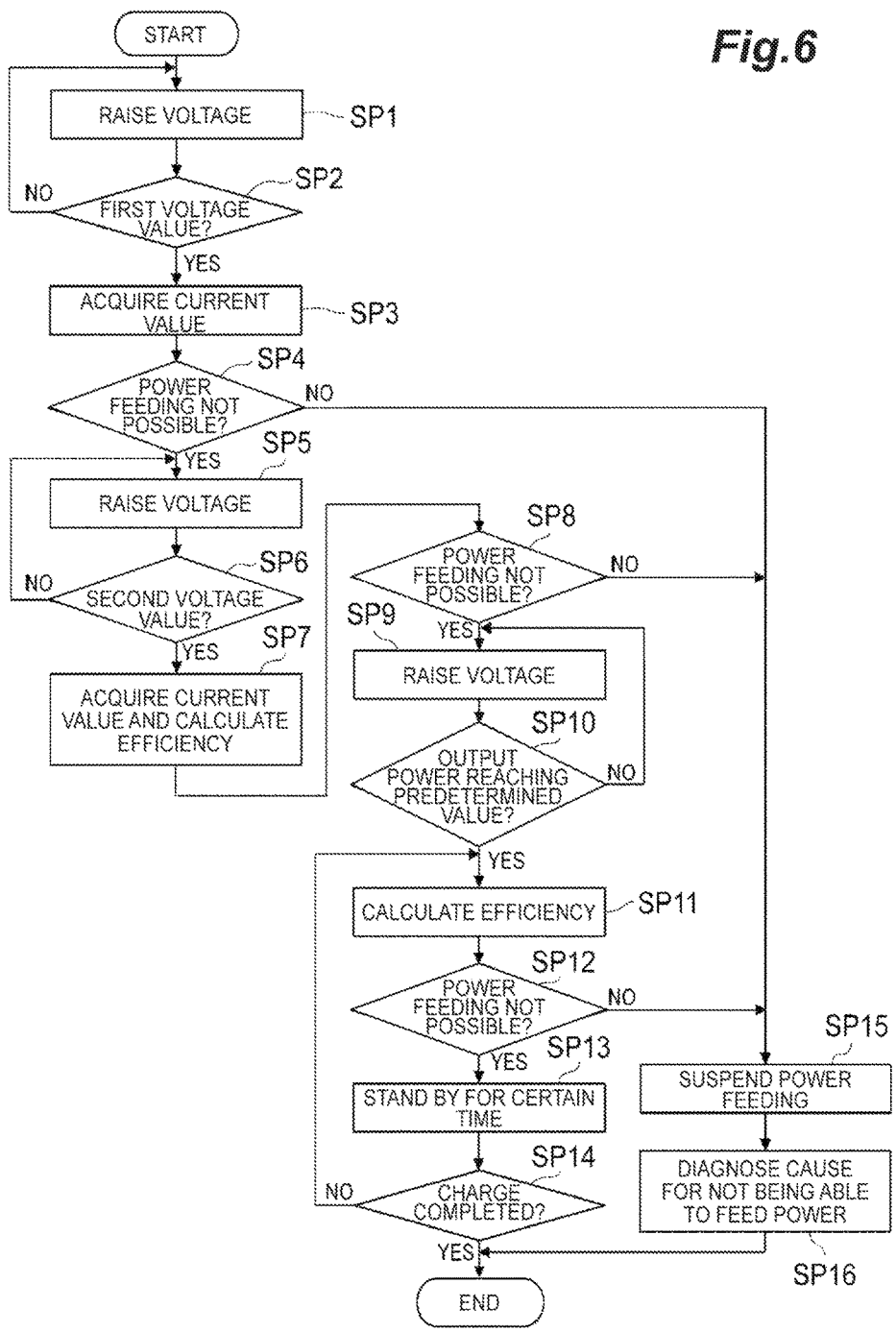
FIG. 6 is a flowchart illustrating a procedure of a power transmission control process.

FIG. 6 illustrates a procedure of a power transmission control process executed by the power transmission-side control unit 15 of the power transmitter 2 with regard to the power transmission control scheme of the present embodiment. The power transmission-side control unit 15 controls transmission of power to the power receiver 3 according to the procedure illustrated in FIG. 6.

In practice, the power transmission-side control unit 15 starts the power transmission control process illustrated in FIG. 6 in response to an instruction to start the operation of transmitting power to the power receiver 3 being received from the user. First, the power transmission-side control unit 15 increases a duty ratio of time during which a driving signal is turned ON to time during which the driving signal is turned OFF by a predetermined amount. Here, the driving signal is applied to the switching transistor TR (FIG. 2) of the chopper circuit 21 (FIG. 2) of the power transmission-side power converter 10. In this way, the power transmission-side control unit 15 raises the voltage of the first DC power output from the power transmission-side power converter 10 to the inverter circuit 11 (step SP1). The start of the power transmission control process is not restricted to the instruction from the user. For example, one of the power transmitter 2 and the power receiver 3 may send a communication connection request to the other one on a regular basis, and the power transmission control process may start when communication connection is established by power transmitter 2 and the power receiver 3 approaching each other.

Subsequently, the power transmission-side control unit 15 determines whether the voltage of the first DC power reported from the power transmission-side sensor 13 reaches the first voltage value $E_1$ described above with reference to FIG. 5 (step SP2). The power transmission-side control unit 15 returns to step SP1 when a negative result is obtained in determination of step SP2, and then repeats a loop of step SP1 to step SP2 to step SP1 until an affirmative result is obtained in step SP2.

The power transmission-side control unit 15 obtains the affirmative result in step SP2 when the voltage of the first DC power eventually reaches the first voltage value $E_1$ (FIG. 3). In this instance, the power transmission-side control unit 15 acquires the current value of the first DC power reported from the power transmission-side sensor 13 (SP3). The power transmission-side control unit 15 determines whether power cannot be fed to the power receiver 3 based on the acquired current value of the first DC power (step SP4). Specifically, the power transmission-side control unit 15 determines whether the acquired current value of the first DC power is either greater than the current upper limit threshold value $SH_2$ (FIG. 3) or less than the current lower limit threshold value $SH_1$ (FIG. 3) in step SP4.

When an negative result is obtained in determination of step SP4, the power transmission-side control unit 15 suspends output of the first DC power by suspending application of the driving signal to the switching transistor TR of the chopper circuit 21 of the power transmission-side power converter 10. In this way, the power transmission-side control unit 15 suspends transmission of power to the power receiver 3 by the power transmitter 2 (step SP15). The power transmission-side control unit 15 diagnoses cause of not being able to feed power to the power receiver 3 after step SP15 (step SP16), and displays a result of diagnosis on the display unit 16. Thereafter, the power transmission-side control unit 15 terminates the power transmission control process.

On the other hand, when a affirmative result is obtained in determination of step SP4, the power transmission-side control unit 15 raises the voltage of the first DC power similarly to step SP1 (step SP5).

The power transmission-side control unit 15 determines whether the voltage of the first DC power reported from the power transmission-side sensor 13 reaches the second voltage value $E_2$ (see FIG. 3) (step SP6). Further, when a negative result is obtained in determination of step SP6, the power transmission-side control unit 15 returns to step SP5, and then repeats a loop of step SP5 to step SP6 to step SP5 until an affirmative result is obtained in step SP6.

The power transmission-side control unit 15 obtains the affirmative result in step SP6 when the voltage of the first DC power eventually reaches the second voltage value $E_2$. In this instance, the power transmission-side control unit 15 acquires the current value and the voltage value of the first DC power reported from the power transmission-side sensor 13. The power transmission-side control unit 15 communicates with the power reception-side communication unit 33 of the power receiver 3 (see FIG. 1) through the power transmission-side communication unit 14 (see FIG. 1), thereby acquiring the current value and the voltage value of the second DC power supplied to the battery 4 by the power reception-side power converter 31 (see FIG. 1) at this time. Further, the power transmission-side control unit 15 calculates the power transmission efficiency η using Equation (1) based on the current value and the voltage value of the first DC power and on the current value and the voltage value of the second DC power acquired as described above (step SP7).

Subsequently, the power transmission-side control unit 15 determines whether power cannot be fed to the power receiver 3 as described above based on the current value of the first DC power acquired in step SP7 and the above-described power transmission efficiency η (step SP8). Specifically, in step SP8, the power transmission-side control unit 15 determines whether the current value of the first DC power acquired in step SP7 is either greater than the current upper limit threshold value $SH_2$ (FIG. 3) or less than the current lower limit threshold value $SH_1$ (FIG. 3), or whether the power transmission efficiency η is less than the efficient threshold value.

Further, when an negative result is obtained in determination of step SP8, the power transmission-side control unit 15 suspends transmission of power to the power receiver 3 by the power transmitter 2 similarly to the above description (step SP15). Thereafter, the power transmission-side control unit 15 diagnoses cause for not being able to feed power to the power receiver 3 (step SP16), and displays a result of diagnosis on the above-described display unit 16. Thereafter, the power transmission-side control unit 15 terminates the power transmission control process.

On the other hand, when a affirmative result is obtained in determination of step SP8, the power transmission-side control unit 15 raises the voltage of the first DC power similarly to step SP1 (step SP9).

The power transmission-side control unit 15 determines whether the second DC power output from the power reception-side power converter 31 to the battery 4 reaches a predetermined value due to a further increase in the voltage of the first DC power reported from the power transmission-side sensor 13 (step SP10). Further, when a negative result is obtained in determination of step SP10, the power transmission-side control unit 15 returns to step SP9, and then repeats a loop of step SP9 to step SP10 to step SP9 until an affirmative result is obtained in determination of step SP10.

Further, the power transmission-side control unit 15 obtains the affirmative result in step SP10 when the voltage of the first DC power eventually reaches the power feeding time voltage value $E_3$. The power transmission-side control unit 15 calculates the power transmission efficiency η similarly to step SP7 (step SP11). The power transmission-side control unit 15 determines whether power cannot be fed to the power receiver 3 based on the calculated power transmission efficiency η (step S12). Specifically, the power transmission-side control unit 15 determines whether the power transmission efficiency η calculated in step SP11 is less than the efficient threshold value in step SP12.

Further, when an negative result is obtained in determination of step SP12, the power transmission-side control unit 15 suspends transmission of power to the power receiver 3 by the power transmitter 2 similarly to the above description (step SP15). Thereafter, the power transmission-side control unit 15 diagnoses cause of not being able to feed power to the power receiver 3 (step SP16), and displays a result of diagnosis on, for example, the above-described display unit. Thereafter, the power transmission-side control unit 15 terminates the power transmission control process.

On the other hand, when a affirmative result is obtained in determination of step SP12, the power transmission-side control unit 15 stands by for a certain time while controlling the power transmission-side power converter 10 such that the voltage of the first DC power is maintained at the power feeding time voltage value $E_3$ (step SP13). Thereafter, the power transmission-side control unit 15 determines whether the battery 4 is fully charged by communicating with the battery 4 (step S14).

Further, when a negative result is obtained in determination of step SP14, the power transmission-side control unit 15 returns to step SP11, and then repeats processing after step SP11. Furthermore, when the battery 4 is eventually fully charged, the power transmission-side control unit 15 obtains an affirmative result in step SP14. Thereafter, the power transmission-side control unit 15 terminates the power transmission control process.

(3) Effect of the Present Embodiment

As described in the foregoing, in the wireless power transfer system 1 of the present embodiment, the voltage of the first DC power output from the power transmission-side power converter 10 to the inverter circuit 11 is suppressed at the first voltage value $E_1$ lower than the power feeding time voltage value $E_3$ at an initial time of the operation of transmitting power to the power receiver 3 by the power transmitter 2, whether power can be fed to the power receiver 3 is determined based on the current value of the first DC power at this time, and the power transmission-side power converter 10 is controlled such that outputting of the first DC power to the inverter circuit 11 is suspended when it is determined that power cannot be fed to the power receiver 3.

In this case, the above determination is performed only based on information obtainable by the power transmitter 2 without the power transmitter 2 communicating with the power receiver 3. For this reason, for example, the above determination can be performed even when positions of the power transmission coil CL2 and the power reception coil CL4 are greatly shifted, and the power transmitter 2 cannot communicate with the power receiver 3.

In the wireless power transfer system 1, the above determination is performed while the voltage of the first DC power is suppressed at the first voltage value $E_1$ lower than the power feeding time voltage value $E_3$ as described above. For this reason, the power transmitter 2 or the power transmitter 3 may be previously and effectively prevented from being damaged due to an overcurrent or an overvoltage occurring in the power transmitter 2 or the power transmitter 3 at the time of the above determination.

Therefore, according to the wireless power transfer system 1 of the present embodiment, misalignments of the power transmission coil CL2 and the power reception coil CL4, etc. may be detected while preventing damage to the power transmitter 2 caused by the overcurrent without requiring a particular component such as a camera for detection of the misalignments of the power transmission coil CL2 and the power reception coil CL4. As a result, it is possible to embody a wireless power transfer system capable of determining whether power can be fed to a power receiver without using a camera.

(4) Modified Example

In the above embodiment, a description has been given of a case in which the invention is applied to the wireless power transfer system 1 that charges the battery 4 installed in the electric vehicle. However, the invention is not restricted thereto. For example, the invention is widely applicable to various other wireless power transfer systems that target a moving body, which is driven using electric energy stored in a battery as an energy source, such as a hybrid vehicle using a gasoline engine and a motor as a power source. The moving body is not restricted to a vehicle body of a vehicle running on a ground, and the invention is applicable to another moving body such as an underwater sailing body.

In the above-described embodiment, a description has been given of a case in which the wireless power transfer system 1 according to the present embodiment is configured as in FIG. 1 and FIG. 2. However, the invention is not restricted thereto, and a configuration other than the configuration of FIG. 1 and FIG. 2 may be widely applied.

Further, in the above-described embodiment, as described above with regard to FIG. 5, a description has been given of a case in which the first DC power output from the power transmission-side power converter 10 of the power transmitter 2 to the inverter circuit 11 is raised in three discrete steps while the current value of the first DC power and the power transmission efficiency η are monitored. However, the invention is not restricted thereto. The first DC power may be raised in four or more discrete steps while the current value of the first DC power and the power transmission efficiency η are monitored.

Furthermore, in the above-described embodiment, a description has been given of a case in which the power transmission-side power converter 10 adjusts a DC voltage value using the chopper circuit 21. However, the invention is not restricted thereto. For example, the DC voltage value may be adjusted using an insulation type DC-DC converter using a transformer, etc. rather than a non-insulation type DC-DC converter using the chopper circuit 21.

Furthermore, in the above-described embodiment, a description has been given of a case in which a power supply source of the power transmission-side power converter 10 corresponds to the commercial power supply 17. However, the invention is not restricted thereto. For example, various supply devices such as a commercial AC power source or DC power source, a solar panel, and a storage battery system may be applied as the power supply source. When the DC power source is applied as the power supply source, the power transmission-side power converter 10 may not convert AC power to DC power, and thus the rectifier 20 may be omitted. When the DC power source is applied as the power supply source, the power transmission-side power converter 10 corresponds to a DC/DC converter.

Furthermore, in the above-described embodiment, a description has been given of a case in which the battery 4 is applied as a load corresponding to a power supply destination of the power receiver 3. However, the invention is not restricted thereto. For example, the invention may be applied to a case in which electric equipment/electronic equipment driven by power corresponds to a load.

Second Embodiment

Figure 7:
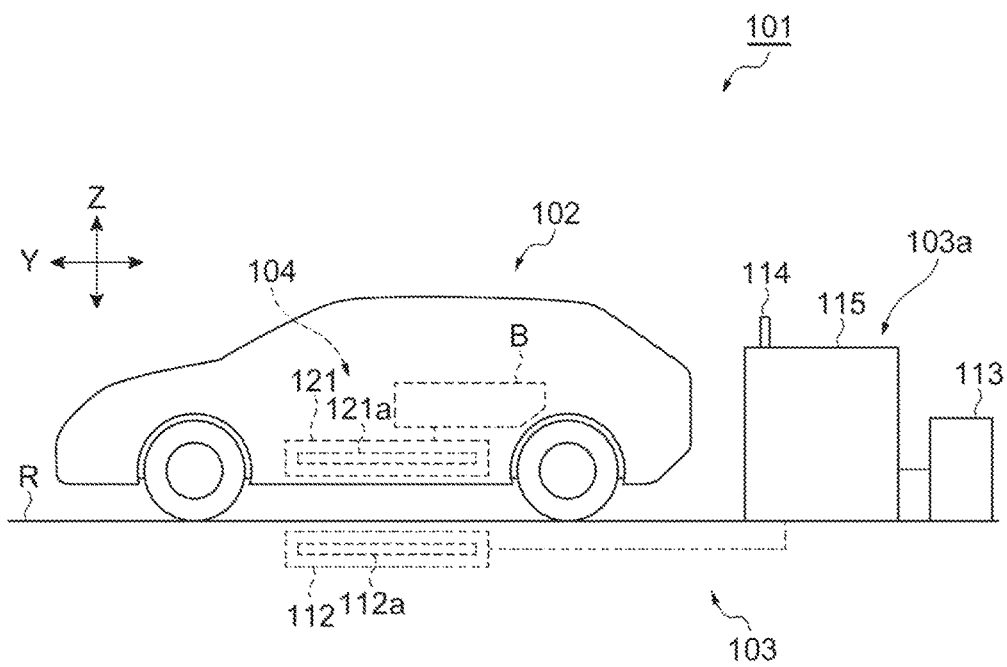
FIG. 7 is a schematic diagram of a wireless power transfer system of a second embodiment of the disclosure.
Figure 8:
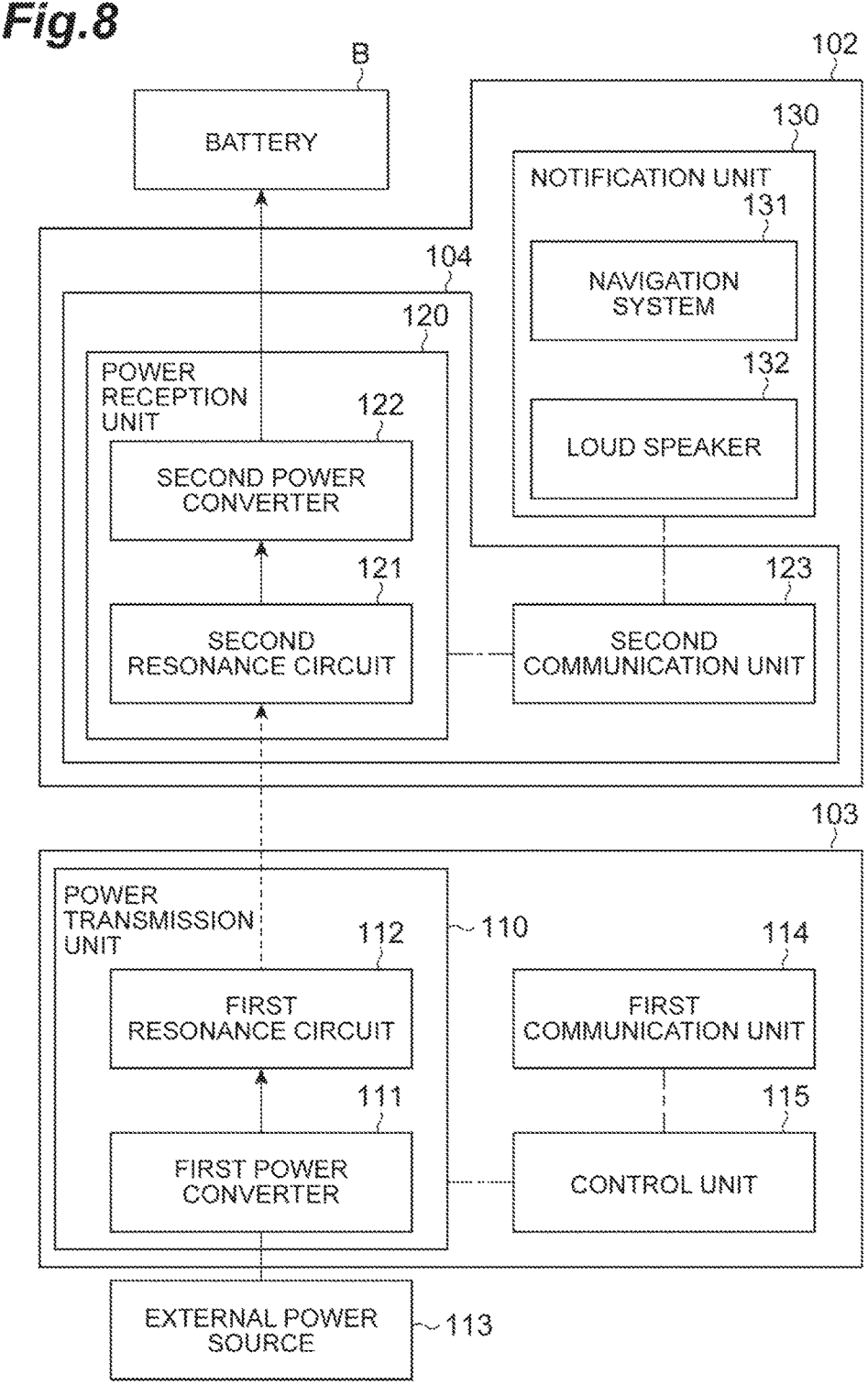
FIG. 8 is a block diagram illustrating a configuration of the wireless power transfer system of FIG. 7.

As illustrated in FIG. 7 and FIG. 8, a wireless power transfer system 101 is a system (device) for charging a battery B installed in a vehicle 102 such as an electric vehicle or a hybrid vehicle. Referring to FIG. 7, a Y direction corresponds to a front-rear direction of the vehicle 102, and a Z direction corresponds to a vertical direction of the vehicle 102.

The wireless power transfer system 101 includes a power transmitter 103 installed on a ground side and a power receiver 104 provided on the vehicle 102 side. The power transmitter 103 is configured to be able to wirelessly transmit power (power for charging the battery B) to the power receiver 104 of the vehicle 102. For example, the power transmitter 103 wirelessly transmits power when the vehicle 102 running on the ground stops in a predetermined positional relation.

The power transmitter 103 includes a power transmission unit 110, a first communication unit 114, and a control unit (controller) 115. The power transmission unit 110 is a device connected to an external power source 113 (for example, a commercial power supply) and used to wirelessly transmit power to the vehicle 102. The power transmission unit 110 includes a first power converter 111 and a first resonance circuit 112.

The first power converter 111 is a circuit that converts AC power supplied from the external power source 113 into high-frequency power. The first power converter 111 is stored in a main body 103a of the power transmitter 103. For example, the first power converter 111 includes a rectifier and an inverter circuit. The rectifier converts (rectifies) AC power from the external power source 113 into DC power. The inverter circuit converts the DC power into AC power (high-frequency power), a frequency of which is higher than that of the AC power of the external power source 113. The first power converter 111 transmits the inverted high-frequency power to the first resonance circuit 112.

The first resonance circuit 112 wirelessly supplies the power, which is supplied from the first power converter 111, to the vehicle 102. The first resonance circuit 112 is buried in a ground R. The first resonance circuit 112 is installed such that an upper surface thereof is flush with the ground R. The first resonance circuit 112 may be installed to protrude from the ground R. The first resonance circuit 112 includes a power transmission coil 112a. The power transmission coil 112a is a coil for wirelessly transmitting power, which is supplied from the first power converter 111, to the vehicle 102. For example, the power transmission coil 112a has a predefined coil shape and dimensions. The shape of the power transmission coil 112a may correspond to a circular type or a solenoid type. The first resonance circuit 112 feeds the high-frequency power from the first power converter 111 to the power transmission coil 112a. In this way, the first resonance circuit 112 embodies wireless power transfer to the vehicle 102. In addition to the power transmission coil 112a, the first resonance circuit 112 may include at least one capacitor, and further include an inductor. The capacitor and the inductor are connected to the power transmission coil 112a in parallel or in series, and various circuit topologies are formed.

In the first resonance circuit 112, a magnetic coupling circuit is formed between the first resonance circuit 112 and a second resonance circuit 121. More specifically, the magnetic coupling circuit is formed when the power transmission coil 112a and a power reception coil 121a provided in the vehicle 102 are aligned close to each other. The magnetic coupling circuit refers to a circuit in which the power transmission coil 112a and the power reception coil 121a are magnetically coupled together and power is wirelessly transmitted from the power transmission coil 112a to the power reception coil 121a. The magnetic coupling circuit mentioned herein refers to a circuit that transmits power using a "magnetic resonance scheme". The magnetic coupling circuit may be a circuit that transmits power using an "electromagnetic induction scheme".

The first resonance circuit 112 transmits power from the power transmission coil 112a to the power reception coil 121a of the vehicle 102 through the magnetic coupling circuit. In this way, the first resonance circuit 112 is enabled to perform wireless power transfer. The first resonance circuit 112 wirelessly transmits power to the vehicle 102 according to a degree of coupling K of the magnetic coupling circuit between the first resonance circuit 112 and the second resonance circuit 121. The degree of coupling K is a degree of magnetic coupling between the power transmission coil 112a and the power reception coil 121a. The degree of coupling K changes according to specifications (for example, a shape) of the power transmission coil 112a and the power reception coil 121a, a distance between power transmission and power reception, etc. The degree of coupling K may have a value in a range of 0 to 1. The degree of coupling K approaches 1 as the degree of magnetic coupling is stronger, and approaches 0 as the degree of magnetic coupling is weaker.

Referring to the degree of coupling K, the degree of magnetic coupling is prone to become stronger as the distance between power transmission and power reception becomes smaller. For this reason, the degree of coupling K is prone to approach 1 as the distance between power transmission and power reception becomes smaller. Referring the degree of coupling K, the degree of magnetic coupling is prone to become weaker as the distance between power transmission and power reception becomes larger. For this reason, the degree of coupling K is prone to approach 0 as the distance between power transmission and power reception becomes larger. Herein, the distance between power transmission and power reception refers to a distance in which the power transmission coil 112a and the power reception coil 121a are separated from each other in a direction intersecting the vertical direction (for example, the Y direction of FIG. 7) (that is, a misalignment amount between the power transmission unit 110 and the power reception unit 120 in the front-rear direction and the left-right direction of the vehicle 102). For example, a distance in which the power transmission coil 112a and the power reception coil 121a are separated from each other in the vertical direction (the Z direction of FIG. 7) (that is, a gap of the vehicle 102 in a height direction) changes according to a model of the vehicle 102 in which the power reception unit 120 is installed.

The external power source 113 is a power source that supplies necessary power to generate power to be transmitted to the vehicle 102. For example, the external power source 113 supplies three-phase AC power, a voltage of which is 200 V. The external power source 113 may be a power source that supplies single-phase AC power such as commercial AC power without being restricted to three-phase AC power. The external power source 113 is stored in the main body 103a of the power transmitter 103.

The first communication unit 114 is an interface for wireless communication. The first communication unit 114 is provided in the main body 103a of the power transmitter 103. The first communication unit 114 communicates with a second communication unit 123 provided in the vehicle 102. The second communication unit 123 is installed in the vehicle 102. For example, a wireless LAN, Bluetooth (registered trademark), etc. may be used as the first communication unit 114.

For example, the control unit 115 is an electronic control unit including a CPU, a ROM, a RAM, etc. The control unit 115 controls power supply from the power transmission unit 110 to the power reception unit 120. The control unit 115 controls the power transmission unit 110 to change a magnitude of power supplied from the power transmission unit 110 to the power reception unit 120. For example, the control unit 115 may perform a control operation such that power supply from the power transmission unit 110 to the power reception unit 120 is suspended when electrical abnormality occurs in the power reception unit 120 on the vehicle 102 side, etc. When the control unit 115 is provided on the power transmission side, the power reception unit 120 on the vehicle 102 side may be inhibited from increasing in size.

The control unit 115 performs a determination control operation of determining whether a misalignment between the power transmission coil 112a and the power reception coil 121a falls within a permissible range. The permissible range mentioned herein refers to a range of a misalignment that allows wireless power transfer from the power transmission coil 112a to the power reception coil 121a. The misalignment that allows wireless power transfer refers to a misalignment corresponding to a case in which a positional relation between the power transmission coil 112a and the power reception coil 121a is a positional relation in which a magnetic coupling circuit capable of supplying power of desired electric energy at desired efficiency between the power transmission coil 112a and the power reception coil 121a is formed. In other words, the permissible range mentioned herein includes a misalignment corresponding to a case in which efficiency of power supply involving no practical problem is obtained in addition to a case in which efficiency of power supply from the power transmission coil 112a to the power reception coil 121a is maximized. The control unit 115 performs a control operation to be in a state that approximates to a state in which the misalignment is not present rather than to strictly exclude the misalignment such that efficiency of power supply from the power transmission coil 112a to the power reception coil 121a is maximized. When the misalignment falls within the permissible range, the control unit 115 allows a notification unit 130 described below to notify a driver of the vehicle 102 that the misalignment falls within the permissible range (transmission of a vehicle stop request).

The control unit 115 detects a change in a characteristic value related to power supply, the change occurring depending on a misalignment amount MA between the power transmission coil 112a and the power reception coil 121a. The control unit 115 performs a determination control operation based on the change in the characteristic value. Herein, the characteristic value is a voltage $V_2$ applied to the power reception coil 121a by power supply from the power transmission coil 112a. The characteristic value may be a value of power received by the power reception coil 121a rather than a voltage. The control unit 115 detects a change in the voltage $V_2$ applied to the power reception unit 120 by communicating with the second communication unit 123 through the first communication unit 114.

The vehicle 102 includes the power receiver 104, the notification unit 130, the battery B, and a charging circuit (not illustrated). Although omitted in FIG. 7, the vehicle 102 includes components necessary for running such as a motor, an operation handle, and a brake. The power receiver 104 includes the power reception unit 120 and the second communication unit 123.

The power reception unit 120 is a device wirelessly supplied with power from the power transmission coil 112a and used to receive the supplied power. The power reception unit 120 includes the second resonance circuit 121 and a second power converter 122. The power reception unit 120 detects the voltage $V_2$ applied to the power reception unit 120 by power supply from the power transmission coil 112a, and communicates with the second communication unit 123.

The second resonance circuit 121 receives power wirelessly supplied from the first resonance circuit 112, and transfers the power to the second power converter 122. The second resonance circuit 121 is provided at a bottom of the vehicle 102. The second resonance circuit 121 includes the power reception coil 121a. The power reception coil 121a is a coil for receiving power (AC power) wirelessly supplied from the power transmission coil 112a. For example, the power reception coil 121a has substantially the same coil shape and dimensions as those of the power transmission coil 112a. The shape of the power reception coil 121a may correspond to a circular type or a solenoid type. In addition to the power reception coil 121a, the second resonance circuit 121 may include at least one capacitor, and further include an inductor. The capacitor and the inductor are connected to the power reception coil 121a in parallel or in series, and various circuit topologies are formed.

When the degree of coupling K changes due to a change in a distance between the power transmission coil 112a and the power reception coil 121a, impedance of the magnetic coupling circuit changes. A characteristic value may become a maximum value at the time of occurrence of a misalignment depending on circuit topologies of the first resonance circuit 112 and the second resonance circuit 121 and a frequency of high-frequency power output from the first power converter 111. For example, the voltage $V_2$ (characteristic value related to power supply) applied to the power reception unit 120 by power supply from the power transmission unit 110 becomes a maximum value in a first distance. The maximum value of the voltage $V_2$ is detected by the control unit 115. The maximum value of the voltage $V_2$ is used when a determination control operation is performed.

A limiter (not illustrated) is provided in the second resonance circuit 121. The limiter prevents a component (for example, a capacitor) included in the second power converter 122 from being damaged due to power transmitted to the second power converter 122 becoming excessive when the voltage $V_2$ applied to the power reception unit 120 becomes the maximum value. A circuit that can be damaged due to excessive power is not restricted to the second power converter 122, and the second resonance circuit 121 or the power transmission unit 110 is a target. For example, the limiter suppresses the voltage $V_2$ applied to the power reception unit 120 at a suppression voltage $V_L$ or less. Herein, for example, the suppression voltage $V_L$ is greater than a voltage $V_B$ applied to the power reception unit 120 using rated charging power of the battery B. The voltage $V_B$ is a voltage applied to the power reception unit 120 when abnormality is not present in the power transmission unit 110, the power reception unit 120, etc. in a state in which the power transmission coil 112a and the power reception coil 121a face each other to charge the battery B. The limiter may suppress a current together with the voltage at a certain value or less, or suppress the current instead of the voltage at a certain value or less.

The second power converter 122 is a circuit that rectifies high-frequency power transmitted from the second resonance circuit 121 and converts the rectified power into DC power. The second power converter 122 is installed in the vehicle 102. For example, the second power converter 122 includes a rectifier and a DC/DC converter circuit, and converts high-frequency power from the second resonance circuit 121 into DC power. The second power converter 122 supplies the converted DC power to the battery B. The battery B is a rechargeable battery (for example, a secondary battery such as a lithium-ion battery or a nickel-hydride battery) installed in the vehicle 102. The battery B supplies power to a travel motor (not illustrated). This charging circuit is configured to be controlled based on a power reception control program prepared in advance by a power reception controller (not illustrated).

The second communication unit 123 is an interface for wireless communication. The second communication unit 123 is installed in the vehicle 102. The second communication unit 123 communicates with the first communication unit 114 on the ground side. For example, a wireless LAN, Bluetooth (registered trademark), etc. may be used as the second communication unit 123. The second communication unit 123 transmits a signal that controls the notification unit 130 described below to the notification unit 130. The second communication unit 123 is not restricted to embodying both a function of communicating with the first communication unit 114 and a function of communicating with the notification unit 130 using one piece of hardware. The function of communicating with the first communication unit 114 and the function of communicating with the notification unit 130 may be embodied using separate pieces of hardware, respectively.

When the misalignment between the power transmission coil 112a and the power reception coil 121a is determined to fall within the permissible range by the control unit 115, the notification unit 130 notifies content thereof to the driver of the vehicle 102. In this case, the notification unit 130 receives a signal from the second communication unit 123 to notify that the misalignment falls within the permissible range, and notifies the driver of the vehicle 102 that the vehicle 102 can be stopped, thereby urging the driver of the vehicle 102 to stop the vehicle 102. The notification unit 130 includes a navigation system 131 and a speaker 132. Herein, the notification unit 130 visually notifies the driver by displaying an image on the navigation system 131 (display of the vehicle stop request). The notification unit 130 may acoustically notify the driver by outputting sound to the speaker 132, or notify the driver using a mobile phone terminal of a passenger of the vehicle 102 through the second communication unit 123.

A description will be given of a determination control operation performed by the control unit 115 with reference to FIG. 9 to FIG. 11. For simplification of description, a distance between power transmission and power reception is set to a distance in which the power transmission coil 112a and the power reception coil 121a are separated from each other in the direction intersecting the vertical direction (the front-rear direction of the vehicle 102 corresponding to the Y direction of FIG. 7). The misalignment amount MA, that is, the distance between the power transmission coil 112a and the power reception coil 121a becomes 0 in the Y direction at an origin O of FIG. 11. A plus sign of the misalignment amount MA means that a position of the power transmission coil 112a is shifted from the vehicle 102 in a forward direction (the forward direction is a direction from rear glass toward a windshield of the vehicle). A minus sign of the misalignment amount MA means that the position of the power transmission coil 112a is shifted from the vehicle 102 in a rearward direction. In an example of FIG. 10A, FIG. 10B, FIG. 10C and FIG. 11, the position of the power transmission coil 112a is shifted from the vehicle 102 in the rearward direction. For this reason, the misalignment amount MA is a minus value, and a value of the misalignment amount MA decreases as the position of the power transmission coil 112a is shifted from the vehicle 102 in the rearward direction.

Figure 9:
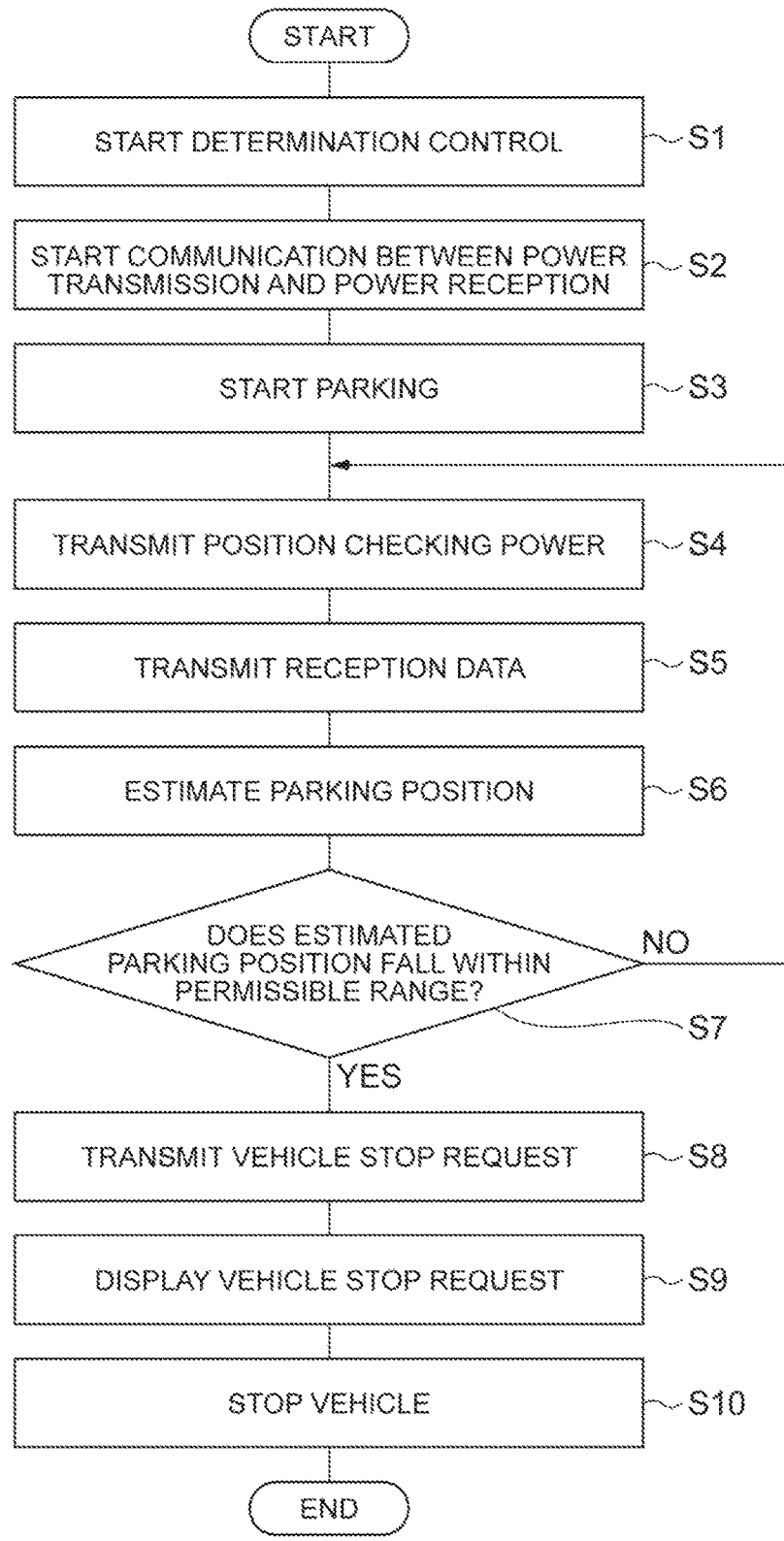
FIG. 9 is a flowchart illustrating determination control processing by a control unit.

As illustrated in FIG. 9, the determination control operation is started by the control unit 115 (step S1). Subsequently, communication between the first communication unit 114 and the second communication unit 123 is started by the control unit 115 (step S2). In this way, the presence of the power receiver 104 is recognized by the power transmitter 103, and the determination control operation is started by the control unit 115.

Figure 10A:
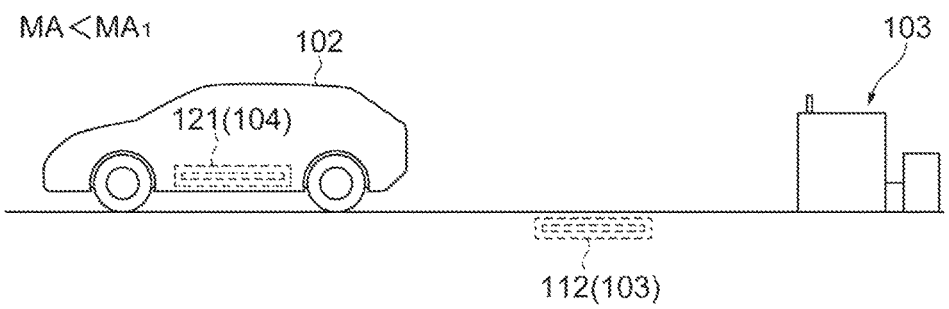
FIG. 10A is a diagram illustrating a state in which a vehicle is aligned outside a permissible range.
Figure 10B:
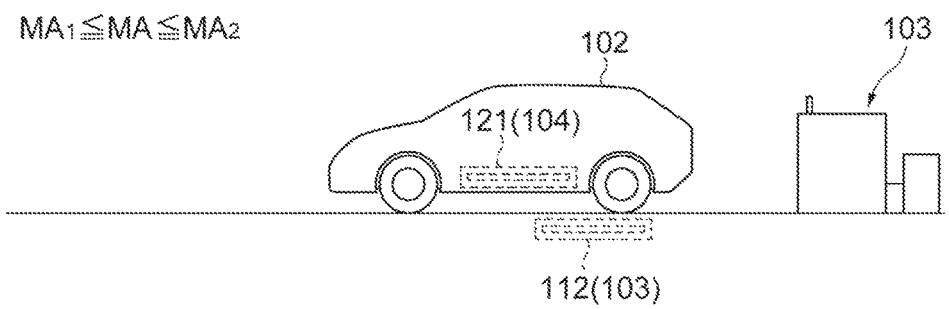
FIG. 10B is a diagram illustrating a state in which the vehicle reaches the permissible range.
Figure 10C:
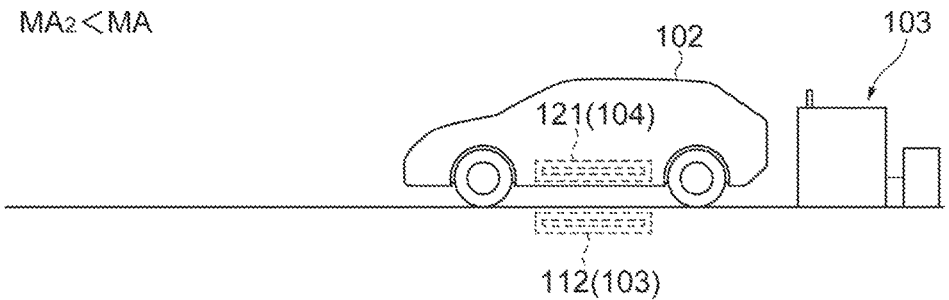
FIG. 10C is a diagram illustrating a state in which the vehicle is aligned within the permissible range.

In step S1 and step S2, the vehicle 102 is shifted from the power transmission coil 112a, and the misalignment amount MA is smaller than $MA_1$ (see FIG. 10A). An absolute value of the misalignment amount MA at this time (the distance between power transmission and power reception) is larger than a distance from the origin O to $MA_1$. In other words, a magnetic coupling circuit is not formed in a degree, in which desired wireless power transfer to the vehicle 102 can be implemented, between the first resonance circuit 112 and the second resonance circuit 121. Parking of the vehicle 102 is started by the driver of the vehicle 102 such that the vehicle 102 approaches the power transmission coil 112a (step S3).

Subsequently, power for checking a position of the vehicle 102 is transmitted by the control unit 115 (step S4). In step S4, power for applying a voltage to the power reception unit 120 by power supply from the power transmission unit 110 is transmitted from the power transmission coil 112a to the power reception coil 121a by the control unit 115. The position checking power is regarded as weak power smaller than charging power of the battery B (for example, 3.3 kW) in order to, for example, prevent the power reception unit 120 from being damaged due to supplied power becoming excessive when the voltage $V_2$ applied to the power reception unit 120 becomes the maximum value. When the position checking power is set to the weak power, electromagnetic waves emitted to a place around the power transmission coil 112a and the power reception coil 121a may be reduced.

For example, when the voltage $V_2$ applied to the power reception unit 120 becomes larger (voltage rises) in a state in which the power transmission coil 112a and the power reception coil 121a do not face each other (at a non-facing time), the voltage rise is desired to be distinguished between a maximum value of the voltage $V_2$ due to resonance or a voltage rise due to abnormality. In this regard, in general, the voltage $V_B$ at the time of normal charging is smaller than the maximum value of the voltage $V_2$ due to resonance (maximum voltage $V_C$). The voltage $V_B$ at the time of normal charging is a voltage applied to the power reception unit 120 using the charging power of the battery B in a state in which the power transmission coil 112a and the power reception coil 121a face each other to charge the battery B (power feeding time). Therefore, for example, when a voltage rises and is reached up to the suppression voltage $V_L$ using the position checking power at the non-facing time, and the voltage $V_B$ is reached using the charging power of the battery B and the voltage does not rise any more at a charging time, the voltage rise at the non-facing time may be determined to be the maximum value of the voltage $V_2$ due to resonance. Meanwhile, when a voltage rises and is reached up to the suppression voltage $V_L$ using the position checking power at the non-facing time, and the voltage rises to exceed the voltage $V_B$ using the charging power of the battery B at the time of charging, the voltage rise at the non-facing time may be determined to be likely to be a voltage rise due to abnormality.

Subsequently, data (power reception data) related to the voltage $V_2$ applied to the power reception unit 120 by the power transmitted in step S4 is transmitted to the first communication unit 114 by the second communication unit 123 (step S5). The power reception data is received by the control unit 115 through the first communication unit 114. A parking position is estimated by the control unit 115 based on the power reception data (step S6). Whether the estimated parking position falls within a permissible range is determined by the control unit 115 (step S7). When the parking position estimated by the control unit 115 is determined not to fall within the permissible range in step S7, the operation proceeds to step S4, and processing of step S4 to step S7 is repeated by the control unit 115 (see FIG. 10B). In step S6 and step S7, when a change in the voltage $V_2$ applied to the power reception unit 120 is detected, a change in the distance between power transmission and power reception is identified by the control unit 115, and the parking position is estimated.

When the vehicle 102 approaches the power transmission coil 112a, the voltage $V_2$ applied to the power reception unit 120 (characteristic value) becomes the maximum voltage $V_C$ in the first distance. When the vehicle 102 further approaches the power transmission coil 112a, the voltage $V_2$ applied to the power reception unit 120 becomes smaller. Specifically, when the misalignment falls within the permissible range after the determination control operation is started by the control unit 115, the voltage $V_2$ applied to the power reception unit 120 increases from a value lower than a range of a value that can be taken by the voltage $V_2$ and becomes the maximum voltage $V_C$. While the voltage $V_2$ decreases after the voltage $V_2$ becomes the maximum voltage $V_C$, whether the voltage $V_2$ has become equal to a threshold value smaller than the maximum voltage $V_C$ is determined by the control unit 115. The threshold value is set to the suppression voltage $V_L$. For example, the suppression voltage $V_L$ is a lower value than a minimum withstand voltage among withstand voltages of respective elements of the power transmission unit 110 and the power reception unit 120. However, the threshold value is not restricted to this example, and may be set by an experiment, etc.

Figure 11:
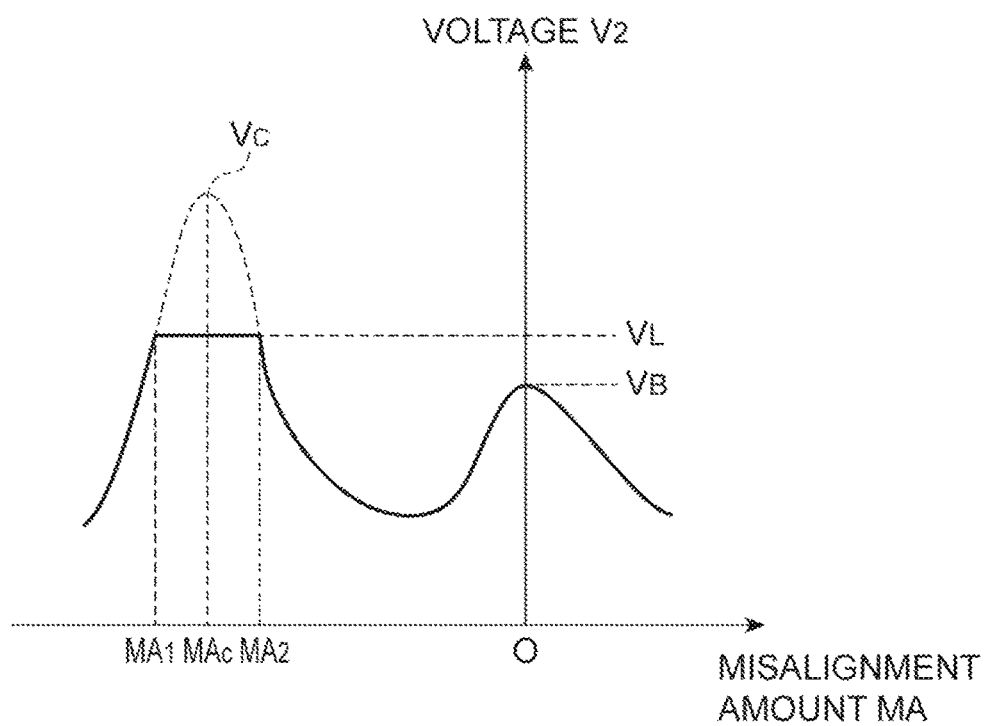
FIG. 11 is a diagram illustrating a voltage applied to a power reception unit by power supply from a power transmission unit.

In the example of FIG. 11, the voltage $V_2$ applied to the power reception unit 120 by power supply from the power transmission coil 112a (characteristic value related to power supply) becomes the maximum voltage $V_C$ at the misalignment amount $MA_C$. For example, when the power transmission coil 112a and the power reception coil 121a correspond to the circular type, positions of the first resonance circuit 112 and the second resonance circuit 121 generating the maximum voltage $V_C$ are concentrically present around a position at which the first resonance circuit 112 and the second resonance circuit 121 face each other when viewed in the Z direction.

The voltage $V_2$ includes the maximum voltage $V_C$ when the misalignment amount MA is a value in a range of $MA_1$ to $MA_2$ since complex impedance of the first resonance circuit 112 and the second resonance circuit 121 in the magnetic coupling circuit becomes smaller. Complex impedance may be described using a Smith chart in which complex impedance is represented as a point on a complex plane. In the Smith chart, for example, a real axis of complex impedance is set as a horizontal axis, and an imaginary axis of complex impedance is set as a vertical axis. In the Smith chart, complex impedance becomes 0Ω (short-circuit) at one end of the horizontal axis. In the Smith chart, complex impedance becomes infinite (open) at the other end of the horizontal axis.

A change in complex impedance is represented as a change in an absolute value and an angle of deviation of complex impedance in the Smith chart. For this reason, a point that represents complex impedance in the Smith chart moves to rotate around the origin of the Smith chart according to the change in complex impedance. The first resonance circuit 112 and the second resonance circuit 121 resonate when complex impedance changes according to the movement. The voltage $V_2$ applied to the power reception unit 120 changes by the resonance. When the change in the voltage $V_2$ applied to the power reception unit 120 is detected using this phenomenon, the change in the distance between power transmission and power reception is identified by the control unit 115, and the parking position is estimated.

The determination control operation starts from the misalignment amount MA smaller than $MA_1$ (the distance between power transmission and power reception greater than a distance from the origin to $MA_1$) as illustrated in FIG. 10A. For this reason, after the determination control operation starts, the misalignment amount $MA_C$ at which the voltage $V_2$ becomes the maximum voltage $V_C$ is present. Therefore, in the determination control operation, after the determination control operation is started by the control unit 115, the voltage $V_2$ applied to the power reception unit 120 (characteristic value) increases to become the maximum voltage $V_C$, and whether the characteristic value has become the suppression voltage $V_L$ (whether the voltage $V_2$ has become an amplitude level in a misalignment permissible range) is determined while the voltage $V_2$ decreases after the voltage $V_2$ becomes the maximum voltage $V_C$. Whether the misalignment falls within the permissible range may be easily determined by the determination control operation.

Subsequently, when the parking position estimated by the control unit 115 is determined to fall within the permissible range in step S7, the vehicle stop request is transmitted to the notification unit 130 by the control unit 115 (step S8). The vehicle stop request is displayed on the navigation system 131 by the notification unit 130 (step S9). For example, an indication such as "charging OK" is displayed on the navigation system 131 as an indication of the vehicle stop request. The displayed vehicle stop request is recognized by the driver of the vehicle 102, and the vehicle 102 is stopped according to the indication of the vehicle stop request (step S10). In this case, a stop operation is performed after the driver of the vehicle 102 recognizes the vehicle stop request, and thus the vehicle 102 continues to proceed toward the second resonance circuit 121 by inertia. As a result, the vehicle 102 may be reliably stopped within the permissible range, and the vehicle 102 may be appropriately stopped at a parking position (optimal range) illustrated in FIG. 10C. When the vehicle 102 passes through the optimal range, the determination control operation may be performed again.

Hereinbefore, in the wireless power transfer system 101, the power transmission unit 110 has the first resonance circuit 112 including the power transmission coil 112a, and the power reception unit 120 has the second resonance circuit 121 including the power reception coil 121a. A change in a characteristic value related to power supply, the change occurring depending on the misalignment amount MA between the power transmission coil 112a of the first resonance circuit 112 and the power reception coil 121a of the second resonance circuit 121 is detected by the control unit 115. Depending on the misalignment amount MA, the degree of coupling K between the power transmission coil 112a and the power reception coil 121a changes, and the voltage $V_2$ applied to the power reception unit 120 (characteristic value) changes. For this reason, a change in a distance between the power transmission coil 112a and the power reception coil 121a (distance between power transmission and power reception) may be identified by detecting the change in the voltage $V_2$ (characteristic value). Therefore, whether the misalignment between the power transmission coil 112a and the power reception coil 121a falls within the permissible range may be easily determined based on the change in the characteristic value.

After the determination control operation starts, when the voltage $V_2$ becomes the suppression voltage $V_L$ while the voltage $V_2$ decreases after the voltage $V_2$ becomes the maximum voltage $V_C$ from a lower value than a range of a value that can be taken by the voltage $V_2$ when the misalignment falls within the permissible range, the control unit 115 determines that the misalignment falls within the permissible range. The suppression voltage $V_L$ mentioned herein is a threshold value for determining whether the misalignment falls within the permissible range, and is smaller than the maximum voltage $V_C$. In this way, after the determination control operation starts, the misalignment amount $MA_C$, at which the voltage $V_2$ becomes the maximum voltage $V_C$ from the lower value than the range of the value that can be taken by the voltage $V_2$ when the misalignment falls within the permissible range, is present. Using this characteristic, the misalignment may be considered to fall within the permissible range when the voltage $V_2$ becomes the suppression voltage $V_L$ while the voltage $V_2$ decreases after the voltage $V_2$ becomes the maximum voltage $V_C$.

The voltage $V_2$ is a voltage applied to the power reception unit 120 by power supply from the power transmission unit 110. In this way, a change in a characteristic value related to power supply may be easily detected.

The wireless power transfer system 101 further includes the notification unit 130. Herein, when the misalignment is determined to fall within the permissible range by the control unit 115, the notification unit 130 notifies content thereof. In this way, for example, the driver of the vehicle 102 in which the wireless power transfer system 101 is installed may easily recognize whether the misalignment falls within the permissible range.

Hereinbefore, one embodiment of the disclosure has been described. However, the invention is not restricted to the above embodiment. For example, even though position checking power is set to weak power smaller than charging power (for example, 3.3 kW) of the battery B in the above embodiment, the position checking power may be set to power having the same magnitude as that of the charging power of the battery B.

The above embodiment illustrates an example in which a charging position is guided by the wireless power transfer system 101 when the driver drives and stops the vehicle 102. However, for example, the charging position may be guided by the wireless power transfer system 101 at the time of automatic parking by a parking assistance device installed in the vehicle 102, etc.

The above embodiment illustrates an example in which the power transmitter 103 is fixed on the ground side, and the power receiver 104 is movable with respect to the power transmitter 103 installed in the vehicle 102. However, for example, it is possible to employ a configuration in which the power transmitter 103 is movable on the ground side with respect to the power receiver 104 installed in a stopped vehicle.

INDUSTRIAL APPLICABILITY

The disclosure is widely applicable to various wireless power transfer systems that feed power using a wireless power transfer scheme in addition to a wireless power transfer system that wirelessly feeds power to an electric vehicle.

The invention claimed is:

1. A power transmitter that wirelessly transmits power to a power receiver, the power transmitter comprising:
   a power converter that converts power fed from a power source into a first direct current (DC) power;
   an inverter circuit that converts the first DC power output from the power converter into a first alternating current (AC) power;
   a power transmission coil that generates a magnetic field based on the first AC power fed from the inverter circuit, and is magnetically coupled with a power reception coil included in the power receiver;
   a sensor that detects a current value and a voltage value of the first DC power; and
   a controller that controls the power converter,
   wherein the controller
   controls the power converter to raise a voltage of the first DC power up to a first voltage value lower than a power feeding time voltage value predetermined as a voltage value at a time of feeding power to the power receiver, and
   determines whether power is not allowed to be fed to the power receiver based on the current value of the first DC power detected by the sensor when the voltage of the first DC power is the first voltage value.

2. The power transmitter according to claim 1, wherein the controller determines that power is not allowed to be fed to the power receiver when the current value of the first DC power is smaller than a current lower limit threshold value preset as a lower limit of the current value or larger than a current upper limit threshold value preset as an upper limit of the current value.

3. The power transmitter according to claim 2,
   wherein the power receiver
   converts a second AC power acquired through the power reception coil magnetically coupled with the power transmission coil into a second DC power, and supplies the second DC power to a load, and the controller controls the power converter to raise the voltage value of the first DC power up to a second voltage value larger than the first voltage value and smaller than the power feeding time voltage value when the current value of the first DC power falls within a range of the current lower limit threshold value to the current upper limit threshold value, calculates a power transmission efficiency from the power transmitter to the power receiver based on a current value and a voltage value of the second DC power acquired from the power receiver when the voltage value of the first DC power is the second voltage value, and on the current value and the voltage value of the first DC power detected by the sensor when the voltage value of the first DC power is the second voltage value, and determines whether power is not allowed to be fed to the power receiver based on the calculated power transmission efficiency.

4. The power transmitter according to claim 3, wherein the controller determines that power is not allowed to be fed to the power receiver when the power transmission efficiency is less than a preset efficient threshold value.

5. The power transmitter according to claim 4, wherein the controller controls the power converter to raise the voltage of the first DC power until the second DC power becomes a desired value when the power transmission efficiency is larger than or equal to the efficient threshold value, calculates a power transmission efficiency from the power transmitter to the power receiver based on the current value and the voltage value of the second DC power acquired from the power receiver, and the current value and the voltage value of the first DC power detected by the sensor, and determines that power is allowed to be fed to the power receiver when the calculated power transmission efficiency is greater than or equal to the efficient threshold value.

6. The power transmitter according to claim 1, wherein the controller increases the voltage value of the first DC power output from the power converter to the inverter circuit from 0 V to the first voltage value.

7. A power transmission method performed by a power transmitter that wirelessly transmits power to a power receiver, wherein the power transmitter includes a power converter that converts power fed from a power source into a first DC power, an inverter circuit that converts the first DC power output from the power converter into a first AC power, a power transmission coil that generates a magnetic field based on the first AC power fed from the inverter circuit, and is magnetically coupled with a power reception coil included in the power receiver, a sensor that detects a current value and a voltage value of the first DC power, and a controller that controls the power converter, and the power transmission method comprises:

a first step in which the controller controls the power converter to raise a voltage of the first DC power up to a first voltage value lower than a power feeding time voltage value predetermined as a voltage value at a time of feeding power to the power receiver; and a second step in which the controller determines whether power is not allowed to be fed to the power receiver based on the current value of the first DC power detected by the sensor when the voltage of the first DC power is the first voltage value.

8. The power transmission method according to claim 7, wherein in the first step, the controller increases the voltage value of the first DV power output from the power converter to the inverter circuit from 0 V to the first voltage value.

9. A wireless power transfer system comprising:

a power transmission unit that has a first resonance circuit including a power transmission coil;

a power reception unit that has a second resonance circuit including a power reception coil and a limiter, and wirelessly receives power from the power transmission unit; and a controller that controls power supply from the power transmission unit to the power reception unit, wherein the controller detects a change in a characteristic value related to the power supply, the change occurring depending on a misalignment amount between the power transmission coil and the power reception coil, and performs a determination control operation of determining whether a misalignment between the power transmission coil and the power reception coil corresponds to a permissible range based on the change in the characteristic value, and determines that the misalignment corresponds to the permissible range when the characteristic value becomes equal to a threshold value smaller than a maximum value while the characteristic value decreases after the characteristic value becomes the maximum value from a lower value than a range of a value allowed to be taken by the characteristic value when the misalignment corresponds to the permissible range after the determination control operation starts, wherein the characteristic value is a voltage applied to the power reception unit by the power supply from the power transmission unit, wherein the limiter suppresses the voltage applied to the power reception unit at a suppression voltage or less, and wherein the threshold value is set to the suppression voltage.

10. The wireless power transfer system according to claim 9, further comprising a notification unit that notifies that the misalignment corresponds to the permissible range when the misalignment is determined to correspond to the permissible range by the controller.

* * * * *